(12) United States Patent
Colby

(10) Patent No.: US 10,822,110 B2
(45) Date of Patent: Nov. 3, 2020

(54) THREAT COUNTERMEASURE ASSISTANCE SYSTEM

(71) Applicant: Lockheed Martin Corporation, Bethesda, MD (US)

(72) Inventor: Steven D. Colby, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 772 days.

(21) Appl. No.: 15/259,805

(22) Filed: Sep. 8, 2016

(65) Prior Publication Data
US 2017/0183104 A1    Jun. 29, 2017

Related U.S. Application Data

(60) Provisional application No. 62/215,321, filed on Sep. 8, 2015.

(51) Int. Cl.
*B64D 45/00* (2006.01)
*G01C 21/00* (2006.01)
(Continued)

(52) U.S. Cl.
CPC ............ *B64D 45/00* (2013.01); *G01C 21/00* (2013.01); *G01S 7/021* (2013.01); *G08G 5/0017* (2013.01);
(Continued)

(58) Field of Classification Search
CPC .... G08G 5/045; G08G 5/0047; G08D 1/0055; G06T 11/60; G06N 5/04; G01S 13/9303;
(Continued)

(56) References Cited

U.S. PATENT DOCUMENTS

| 3,836,968 A | 9/1974 | Schillreff |
| 4,449,041 A | 5/1984 | Girard |

(Continued)

FOREIGN PATENT DOCUMENTS

| CA | 2580978 A1 | 3/2006 |
| CN | 201918032 U | 8/2011 |

(Continued)

OTHER PUBLICATIONS

Extended European Search Report for European Application No. 16187826.9 dated Jan. 26, 2017.
(Continued)

*Primary Examiner* — Andrew L Tank
(74) *Attorney, Agent, or Firm* — Baker Botts L.L.P.

(57) ABSTRACT

Some embodiments include a countermeasure assistance system that, in response to detecting a threat to an aircraft, calculates and presents via a user interface an instruction to assist a pilot in evading the threat. For example, the system may determine a direction to which the aircraft should be turned to present a beam of the aircraft toward the threat, which may assist in evading a radar-enabled threat. The system may calculate a shortest turn to present the beam to the threat. The system may additionally display information regarding a position, nature, and degree of the threat, including through formatting of at least a portion of a user interface for displaying information regarding the threat. The system may additionally calculate and display an intervisibility zone for the threat and for the aircraft's current position to further assist the pilot in navigating to an area at which the threat may be evaded.

18 Claims, 12 Drawing Sheets

(51) Int. Cl.
*G08G 5/00* (2006.01)
*G01S 7/02* (2006.01)
*G01S 7/12* (2006.01)
*G01S 7/24* (2006.01)

(52) U.S. Cl.
CPC . *G01S 7/12* (2013.01); *G01S 7/24* (2013.01); *G08G 5/006* (2013.01)

(58) Field of Classification Search
CPC ... F41G 7/00; F41G 9/00; F41H 11/02; G01C 21/00; B64D 45/00
See application file for complete search history.

(56) References Cited

U.S. PATENT DOCUMENTS

| | | | |
|---|---|---|---|
| 4,642,648 A * | 2/1987 | Hulland | G01S 13/781 342/32 |
| 4,760,396 A | 7/1988 | Barney et al. | |
| 4,812,990 A | 3/1989 | Adams et al. | |
| 4,947,350 A | 8/1990 | Murray et al. | |
| 5,086,396 A | 2/1992 | Waruszewski, Jr. | |
| 5,111,400 A | 5/1992 | Yoder | |
| 5,122,801 A | 6/1992 | Hughes | |
| 5,287,110 A | 2/1994 | Tran | |
| 5,406,286 A | 4/1995 | Tran et al. | |
| 5,410,313 A | 4/1995 | Tran | |
| 5,428,530 A | 6/1995 | Brown et al. | |
| 5,442,556 A | 8/1995 | Boyes et al. | |
| 5,457,460 A | 10/1995 | Tran et al. | |
| 5,461,571 A | 10/1995 | Tran | |
| 5,526,000 A * | 6/1996 | Chazelle | G05D 1/0646 342/407 |
| 5,549,477 A | 8/1996 | Tran et al. | |
| 5,574,458 A | 11/1996 | Tran | |
| 5,606,500 A | 2/1997 | Tran | |
| 5,631,640 A | 5/1997 | Deis et al. | |
| 5,742,384 A | 4/1998 | Farmer | |
| 5,787,333 A | 7/1998 | Rasinski et al. | |
| 5,838,262 A | 11/1998 | Kershner et al. | |
| 6,002,347 A | 12/1999 | Daly et al. | |
| 6,097,996 A * | 8/2000 | Deker | G05D 1/0202 701/10 |
| 6,127,944 A | 10/2000 | Daly et al. | |
| 6,267,039 B1 | 7/2001 | Czarnecki | |
| 6,282,526 B1 | 8/2001 | Ganesh | |
| 6,369,885 B1 | 4/2002 | Brown et al. | |
| 6,538,581 B2 | 3/2003 | Cowie | |
| 6,604,044 B1 * | 8/2003 | Kirk | G08G 5/0043 701/1 |
| 6,734,824 B2 | 5/2004 | Herman | |
| 6,778,906 B1 | 8/2004 | Hennings et al. | |
| 6,873,893 B1 | 3/2005 | Sanghera et al. | |
| 6,975,246 B1 * | 12/2005 | Trudeau | B60T 7/22 180/167 |
| 6,980,151 B1 | 12/2005 | Mohan | |
| RE39,053 E | 4/2006 | Rees | |
| 7,120,445 B2 | 10/2006 | DeMarco et al. | |
| 7,138,938 B1 | 11/2006 | Prakah-Asante et al. | |
| 7,158,053 B2 * | 1/2007 | Crank | B64D 45/0015 340/5.52 |
| 7,161,500 B2 | 1/2007 | Alfredsson et al. | |
| 7,194,353 B1 | 3/2007 | Baldwin et al. | |
| 7,206,444 B2 | 4/2007 | Herman | |
| 7,210,392 B2 | 5/2007 | Greene et al. | |
| 7,280,897 B2 * | 10/2007 | Allstadt | G01C 21/00 340/961 |
| 7,378,626 B2 | 5/2008 | Fetterly | |
| 7,422,175 B1 | 9/2008 | Bobinchak et al. | |
| 7,599,765 B2 * | 10/2009 | Padan | G08G 5/045 701/3 |
| 7,769,502 B2 | 8/2010 | Herman | |
| 7,826,971 B2 * | 11/2010 | Fontaine | G05D 1/0646 340/945 |
| 7,848,879 B2 | 12/2010 | Herman | |
| 7,885,908 B2 * | 2/2011 | Angell | G06N 5/04 706/45 |
| 7,979,199 B2 | 7/2011 | Judd et al. | |
| 8,005,657 B2 | 8/2011 | Herman et al. | |
| 8,009,515 B2 | 8/2011 | Cecala et al. | |
| 8,025,230 B2 | 9/2011 | Moraites | |
| 8,179,288 B2 * | 5/2012 | Kravitz | F41G 7/224 340/945 |
| 8,185,256 B2 | 5/2012 | Herman | |
| 8,791,836 B2 | 7/2014 | Herman | |
| 8,831,793 B2 | 9/2014 | Herman | |
| 8,868,328 B1 * | 10/2014 | Estkowski | G08G 5/045 701/301 |
| 8,902,098 B2 | 12/2014 | Langsford | |
| 9,030,347 B2 | 5/2015 | Herman et al. | |
| 9,240,001 B2 | 1/2016 | Herman et al. | |
| 9,244,459 B2 | 1/2016 | Herman | |
| 9,279,643 B2 | 3/2016 | Herman | |
| 9,625,577 B1 * | 4/2017 | Finley | G01S 13/95 |
| 2002/0150866 A1 | 10/2002 | Perry et al. | |
| 2003/0019350 A1 | 1/2003 | Khosla | |
| 2003/0060942 A1 | 3/2003 | Kotzev et al. | |
| 2003/0154010 A1 | 8/2003 | Rao et al. | |
| 2003/0215771 A1 | 11/2003 | Bartoldus et al. | |
| 2004/0186636 A1 * | 9/2004 | Mendelson | G05D 1/0055 701/9 |
| 2004/0219491 A1 | 11/2004 | Shlomo | |
| 2005/0038628 A1 | 2/2005 | Beuttel et al. | |
| 2005/0073439 A1 | 4/2005 | Perricone | |
| 2005/0256682 A1 | 11/2005 | Galutia et al. | |
| 2005/0275582 A1 | 12/2005 | Mohan | |
| 2006/0142903 A1 | 6/2006 | Padan | |
| 2006/0163446 A1 | 7/2006 | Guyer et al. | |
| 2006/0184292 A1 | 8/2006 | Appleby et al. | |
| 2006/0266203 A1 | 11/2006 | Herman et al. | |
| 2006/0267827 A1 | 11/2006 | Ferm et al. | |
| 2006/0271245 A1 | 11/2006 | Herman | |
| 2007/0023582 A1 | 2/2007 | Steele et al. | |
| 2007/0206177 A1 | 9/2007 | Anschel et al. | |
| 2007/0210953 A1 | 9/2007 | Abraham et al. | |
| 2007/0244673 A1 | 10/2007 | Khosla et al. | |
| 2007/0288208 A1 | 12/2007 | Grigsby et al. | |
| 2008/0052054 A1 | 2/2008 | Beverina et al. | |
| 2008/0077474 A1 | 3/2008 | Dumas et al. | |
| 2008/0111728 A1 | 5/2008 | Stevens | |
| 2008/0133070 A1 | 6/2008 | Herman | |
| 2008/0136701 A1 | 6/2008 | Ferm et al. | |
| 2008/0158256 A1 | 7/2008 | Russell et al. | |
| 2008/0174454 A1 * | 7/2008 | Bitar | G01C 21/00 340/975 |
| 2008/0258063 A1 | 10/2008 | Rapanotti | |
| 2008/0291075 A1 | 11/2008 | Rapanotti | |
| 2008/0297395 A1 | 12/2008 | Dark et al. | |
| 2009/0173788 A1 | 7/2009 | Moraites et al. | |
| 2009/0271157 A1 | 10/2009 | Herman et al. | |
| 2009/0322584 A1 | 12/2009 | Herman | |
| 2010/0010793 A1 | 1/2010 | Herman | |
| 2010/0017114 A1 | 1/2010 | Tehan et al. | |
| 2010/0039310 A1 * | 2/2010 | Smith | G01S 7/062 342/29 |
| 2010/0078498 A1 | 4/2010 | Gasper | |
| 2010/0135120 A1 | 6/2010 | Cecala et al. | |
| 2010/0145552 A1 | 6/2010 | Herman et al. | |
| 2010/0208075 A1 | 8/2010 | Katsuno | |
| 2010/0231418 A1 | 9/2010 | Whitlow et al. | |
| 2010/0253567 A1 | 10/2010 | Factor et al. | |
| 2011/0001062 A1 | 1/2011 | Herman et al. | |
| 2011/0029234 A1 | 2/2011 | Desai et al. | |
| 2011/0196551 A1 * | 8/2011 | Lees | F41H 11/02 701/14 |
| 2012/0078498 A1 | 3/2012 | Iwasaki et al. | |
| 2012/0276517 A1 | 11/2012 | Banaszuk et al. | |
| 2013/0124089 A1 | 5/2013 | Herman et al. | |
| 2013/0234864 A1 | 9/2013 | Herman | |
| 2013/0245931 A1 | 9/2013 | Rosswog et al. | |
| 2013/0259300 A1 | 10/2013 | Rosswog et al. | |
| 2013/0293406 A1 | 11/2013 | Herman et al. | |
| 2013/0297096 A1 | 11/2013 | Herman | |

(56) References Cited

U.S. PATENT DOCUMENTS

2013/0297271 A1 11/2013 Herman et al.
2014/0309808 A1 10/2014 Herman
2015/0268011 A1 9/2015 Herman

FOREIGN PATENT DOCUMENTS

WO WO 2006/033112 A3 3/2006
WO WO 2013/122521 A1 8/2013

OTHER PUBLICATIONS

[No Author Listed], Lock-on Flaming Cliffs Version 1.1 Dec. 31, 2004. 262 pages.
Chen et al., Detailed planning in air fighter's penetration attack based on tactical stealth. Systems Engineering and Electronics. Engineering Institute, Air Force Engineering University. 2012;34(9):1859-64.
Chen et al., One Method for Real-Time 3D Route Planning with Predicting Capability. Electronics Optics. Engineering Institute, Air Force Engineering University. 2012;19(4):1-5.
Leavitt, Institute of Electrical and Electronics Engineers: Real-Time In-Flight Planning. Proceedings of the IEEE 1996 National Aerospace and Electronics Conference (NAECON). May 20-23, 1996;1:83-9.
Zabarankin et al., Aircraft routing under the risk of detection. Naval Research Logistics. 2006;53(8):728-47.
International Search Report and Written Opinion for International Application No. PCT/US2013/039412 dated Jan. 31, 2014.
International Preliminary Report on Patentability for International Application No. PCT/US2013/039412 dated Nov. 13, 2014.
Butters et al., Infrared Decoy and Obscurant Modeling and Simulation for Ship Protection. 2011, Technologies for Optical Countermeasures VII, SPIE. 16 pages.
Bourassa, Modeling and Simulation of Fleet Air Defense Systems using EADSIM. Jun. 1993, Calhoun Institutional Archive of the Naval Postgraduate School, Dudley Knox Library. 129 pages.
European Communication for European Application No. 13795608.2 dated Dec. 20, 2018.

\* cited by examiner

THREAT COUNTERMEASURE ASSISTANCE SYSTEM

CROSS-REFERENCE TO RELATED APPLICATIONS

This application claims priority under 35 U.S.C. § 119(e) to U.S. Provisional Patent Application Ser. No. 62/215,321, titled "Threat Countermeasure Assistance System" and filed Sep. 8, 2015, the entire contents of which are incorporated herein by reference.

FEDERALLY SPONSORED RESEARCH

This invention was made with Government support under the U.S. Department of Defense, Department of the Air Force, Contract No. FA8629-14-C-2403 and Subcontractor No. 4500365788. The Government may have certain rights to this invention.

BACKGROUND

The response received by a radar system following output of a pulse typically includes a great deal of noise, such that the raw input data has a very low signal-to-noise ratio (SNR). To improve the SNR and improve the usability of the data received in response, a radar system filters the raw data in various ways. One filter that is commonly applied by a radar system is a Doppler shift filter that filters from the raw data signals indicative of objects with a low Doppler shift over time as calculated from multiple responses to radar pulses. When applied to radar that is intended to locate aircraft, the Doppler shift filter is useful at filtering out low-altitude, immobile objects such as trees, brush, hills, buildings, etc.

A known flaw in the Doppler shift filter is that the filter may also remove from the raw signal data signals indicative of a beam of an aircraft, as the beam of the aircraft may exhibit a low Doppler shift. Because of this flaw, a known countermeasure for attempting to defeat a radar system is to turn an aircraft such that the aircraft presents a beam (also known as the "3 o'clock" and "9 o'clock" sides) of the aircraft to the radar system, which is also known as turning toward the "notch."

SUMMARY

In one embodiment, there is provided an aircraft comprising a visual output to display information to an operator of the aircraft and at least one control circuit. The at least one control circuit is configured to, in response to detecting a threat to the aircraft at a first bearing, calculate a second bearing to which the aircraft should be turned to counteract the threat. The at least one control circuit is further configured to determine a direction in which the aircraft should be turned to head toward the second bearing, and output via the visual output an instruction to the operator of the aircraft to turn in the direction.

In another embodiment, there is provided a method for assisting a pilot in evading one or more threats to an aircraft. The method comprises, in response to receiving one or more messages from a threat warning system regarding a threat to the aircraft detected at a first bearing, calculating a second bearing to which the aircraft should be turned to counteract the threat. The method further comprises determining a direction in which the aircraft should be turned to head toward the second bearing and outputting, via a visual output of the aircraft, an instruction to the operator of the aircraft to turn in the direction.

In a further embodiment, there is provided at least one computer-readable storage medium having encoded thereon executable instructions that, when executed by at least one mission processor of an aircraft, cause the at least one mission processor to carry out a method for assisting a pilot in evading one or more threats to the aircraft. The method comprises, in response to receiving one or more messages from a threat warning system regarding a threat to the aircraft detected at a first bearing, calculating a second bearing to which the aircraft should be turned to counteract the threat. The method further comprises determining a direction in which the aircraft should be turned to head toward the second bearing and outputting, via a visual output of the aircraft, an instruction to the operator of the aircraft to turn in the direction.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2, including

DETAILED DESCRIPTION

Figure 1:
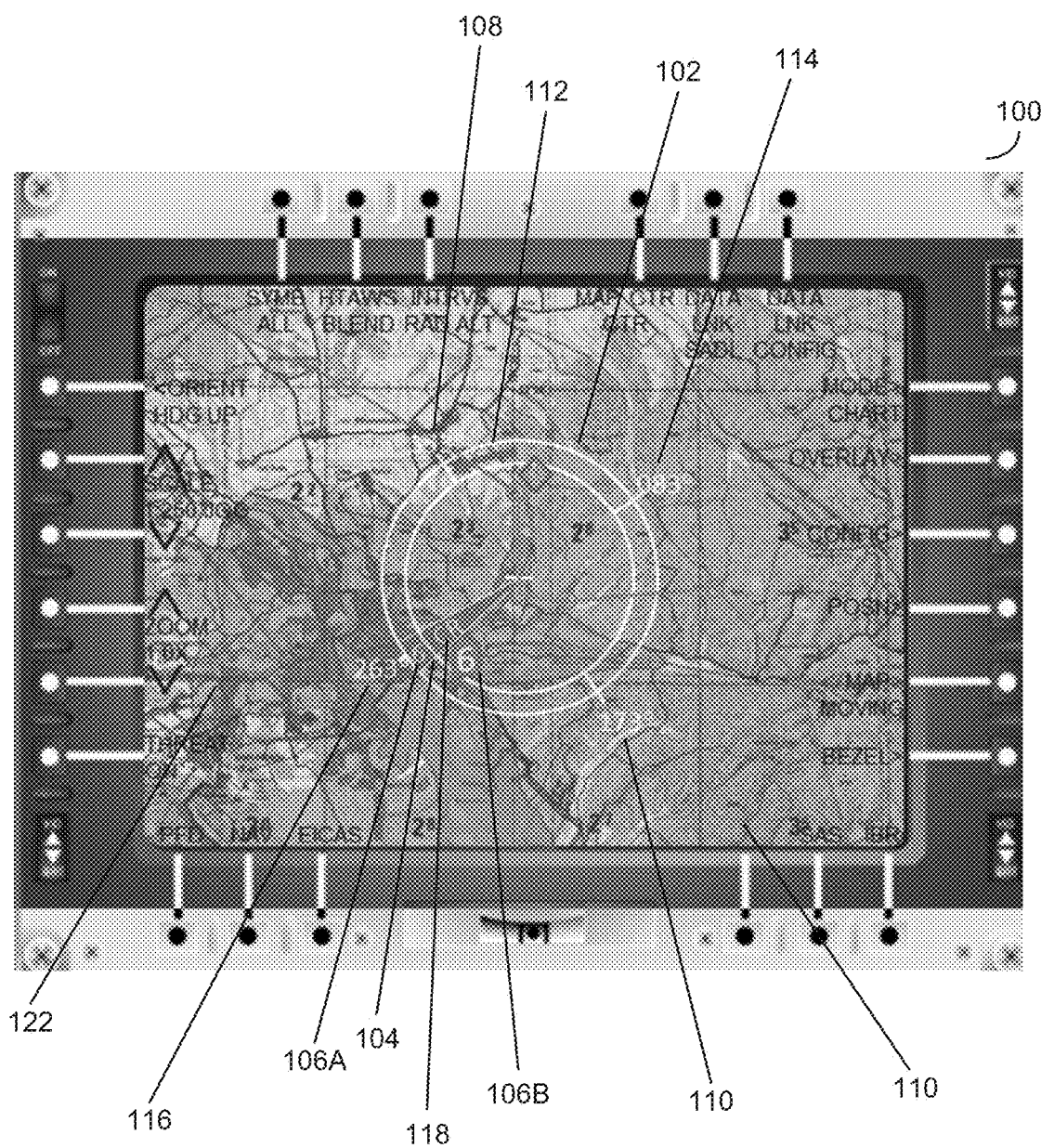
FIG. 1 is a diagram of an exemplary user interface that may be implemented in some embodiments.

Some embodiments include a countermeasure assistance system that, in response to detecting a threat to an aircraft, calculates and presents via a user interface to a pilot of the aircraft instructions to assist the pilot with evading or otherwise counteracting the threat. For example, the countermeasure assistance system may determine and instruct the pilot on a direction to turn to present a beam of the aircraft to a radar system of the threat. In this case, the system may determine the direction to instruct based on calculating a shortest turn to present the beam to the radar system, which could include selecting between turning to present a left-side beam ("9 o'clock") or to present a right-side beam ("3 o'clock"). For example, the user interface may include an arrow indicating a turn to the left or to the right. The user interface may additionally indicate a bearing to which the aircraft should turn to present a beam, and may in some embodiments indicate both bearings to which the aircraft could turn to present a beam. The system may additionally calculate and display in the user interface a bearing from the aircraft's current position to the location of the threat as well as a bearing from the aircraft's current position to move directly away from the threat. For other types of threats, such as those that do not rely on radar or otherwise would not be counteracted by presenting a beam of the aircraft to the threat, the countermeasure assistance system may determine appropriate countermeasures for those threats, based on the nature and/or degree of the threat, and output instructions for such countermeasures to the pilot.

In some embodiments, the system may additionally or alternatively determine and present via the user interface a nature and/or a threat degree posed by the threat to the aircraft. For example, for a radar-enabled threat, the system may analyze a radar signal output by the threat and determine whether the threat is in normal scanning mode, in a targeted search mode, or in a target tracking or weapons launch mode. These different modes indicate a different severity, or degree, of the threat presented to the aircraft, as a radar in a normal scanning mode may not yet have detected the aircraft and present a low degree of threat, whereas a radar in a weapons launch mode may have already detected and "locked on" to the aircraft and present a high degree of threat. Once the threat degree is determined, the threat degree may be presented to the pilot via the user interface. By presenting this information together with instructions on how to counteract the threat, the pilot may be able to make decisions more quickly, which may increase the aircraft's and pilot's chances of survival.

In some embodiments, the system may additionally or alternatively determine and present via the user interface whether a countermeasure system of the aircraft, such as a chaff system or a radar jamming system, is ready to be deployed. In these embodiments, the user interface may include a "countermeasure ready" indicator that indicates when a countermeasure system of the aircraft is ready to be deployed.

In some embodiments, the system may additionally determine and present via the user interface an intervisibility zone in the vicinity of the aircraft. For example, a user interface including any of the previously-discussed features may be displayed superimposed on a map of the surrounding geography. Areas of that geography may be shaded to indicate an intervisibility zone. The intervisibility zone is a known area within which a threat's radar system is more easily able to detect objects such as aircraft. By displaying the intervisibility zone on the user interface, the system may aid the pilot of the aircraft in identifying whether there is an area to which to the pilot may navigate that is outside of the intervisibility zone and thus may provide cover to assist in escaping the threat. By displaying the intervisibility zone together with the information on the shortest turn to present the beam to the threat, the user interface may assist the pilot in determining whether to follow a countermeasure procedure or to navigate to an area that may provide terrain masking.

The inventor has recognized and appreciated that such a system may aid pilots in escaping threats once the threats are detected, including by assisting pilots in properly executing countermeasure procedures. Conventionally, a user interface of an aircraft would warn a pilot aurally that a threat exists and, at most, inform the pilot of the direction from which the threat originates. Such systems left to the pilot the work of identifying the bearings to which the aircraft could be turned to present a beam to the threat and then choosing one of the two bearings to which to turn. Further, countermeasures to be taken by a pilot may vary between types of threat, or may vary over time as the risk presented by the threat increases (e.g., as the thread more precisely targets the aircraft) or the aircraft's available countermeasures change (e.g., as the aircraft deploys some non-reusable countermeasures). Thus, the pilot may have additional considerations, such as analyzing the nature and degree of the threat based on the audible announcement, evaluating the aircraft's current options for countermeasure, and making a selection.

While some pilots are capable of performing such calculations, evaluations, and selections, others pilots may have found these tasks difficult to perform or difficult to perform when faced with a life-threatening situation. In addition, even pilots with good mathematical abilities needed anywhere from one second to several seconds to perform calculations or selections. This delay could make the difference between evading a threat or being engaged or hit with weapons by the threat.

The inventor has therefore recognized the advantages of a system that performs calculations, determinations, and selections for the pilots and presents clear instructions to the pilots on the detected threats and countermeasures that may be employed. The user interface may detect real-time information on the threat, such as a nature of the threat or a degree of the threat, and information on an availability or suitability of one or more countermeasures for evading the threat, and may output for the pilot both information on the threat and instructions or recommendations on evading the threat. When a threat warning system detects that a nature or degree of a threat has changed over time, such as when a threat has become more serious (e.g., a radar "locking" on the aircraft), the user interface may also present to the pilot real-time information on the increased degree of threat, to aid the pilot in adjusting his or her response to the threat. In situations in which there are multiple threats faced by the aircraft, the user interface may make a real-time determination of which pose the greatest threat to the aircraft and issue instructions for that/those threat(s). Information on evading the threat may include instructions or recommendations on countermeasures to employ. For example, the user interface may calculate and instruct the pilot on the bearings to which to turn the aircraft as part of a radar countermeasure procedure, such as by outputting the bearings and an instruction or recommendation of a specific turn to make to put the aircraft on one of those bearings.

Examples of implementations are discussed below, but it should be appreciated that embodiments are not limited to operating in accordance with any of these illustrative embodiments, as other embodiments are possible. Further, it should be appreciated that while some embodiments are described as being implemented as part of a computer system that is a part of a helicopter, embodiments are not limited to being implemented with any particular form of aircraft. Embodiments may also operate with computer systems of planes or other forms of aircraft.

FIG. 1 illustrates an example of a user interface 100 being displayed on a display of a helicopter. The user interface 100 may be displayed in the helicopter in response to a threat warning system detecting a threat to the helicopter. Examples of threat warning systems and ways of detecting threats are discussed in detail below in connection with FIGS. 2A-2B. While the user interface 100 shown in FIG. 1 will be discussed in connection with display of that user interface, it should be appreciated that the user interface may additionally or alternatively present any of the displayed information via another user interface mechanism, such as by outputting the information aurally using prerecorded messages and/or a text-to-speech interface.

The user interface 100 of FIG. 1 includes a ring 102 that includes information related to a detected threat to the helicopter and information related to countermeasures that a pilot may take to attempt to evade the threat. The ring 102 includes a shaded wedge area 104 that indicates a direction from which the threat is engaging. The wedge is centered on a determined bearing to the threat, with a width of the wedge indicating an accuracy of that determined bearing. The ring 102 also includes threat identifiers 106A, 106B that represent a type of the threat and degree of the threat.

The type of threat may indicate different capabilities of the threats, such as different weaponry capabilities and/or different detection and tracking capabilities of the threats. For example, a radar-enabled threat like a missile system may be one type of threat, a firearm or gun may be another type of threat, a laser rangefinder may be another type of threat, and a laser beamrider may be another type of threat. The type of threat may be represented in the identifiers 106A, 106B using a code for the threat, such as "6". Any suitable codes may be used, as embodiments are not limited to using any particular codes to represent any particular types of threats.

A degree of the threat may be represented in the wedge 104 and/or the identifiers 106A, 106B, such as through a formatting of the wedge or code. The degree of the threat may indicate a severity of the threat to the aircraft. Some types of threats may have a single degree of severity, such as firearms or guns. Other types of threats may have multiple degrees of severity, such as based on different degrees based on different inferred detection or tracking modes of the threats. As discussed above, for example, a radar-enabled threat may be associated with multiple threat degrees, based on whether the radar system is inferred to be in a normal scanning (or search) mode and has not yet detected the aircraft (low degree of threat) versus a weapons launch mode following clear detection and tracking of the aircraft (high degree of threat).

The degree of threat may be represented through different ways of formatting the wedge or the code. For example, coloring or animation of the wedge 104 and/or the identifiers 106A, 106B may be used to indicate a degree of the threat. For example, a steady shading of one color may indicate one degree of threat (e.g., a lower-level threat), while when a degree of a threat increases the shading and/or color may change. For example, the color shading may be flashed on and off, or between different colors, to indicate a threat of another degree. As another example, the transparency of the wedge may be adjusted over time, in a cycling gradient, to indicate another degree of threat. As a further example, the color of the wedge may be cycled in a direction from the aircraft to the detected location of the threat (or vice versa, from the threat to the aircraft), such as by animating the cycling between two colors or between one color and no color. Such a cycling in a direction may include an animation of a "growing" wedge, as the color is applied to the user interface progressively over time to show more color proceeding in the direction of the animation.

As an example of indicating degree of threat via formatting of the identifier/code, a formatting type, such as a font, may be used to indicate degree. As a specific example, when the system determines that a threat's radar is still in search and acquire mode, the code may be displayed using one formatting type (e.g., unformatted font). If, however, the system determines that a threat's radar has entered search mode, the code may be displayed using a first type of emphasis such as bold font. If the system determines that a threat's radar has then entered a track or weapons launch mode, the code may be displayed using a second type of emphasis such as flashing bold font.

Techniques for detecting a type and/or a degree of a threat, such as for detecting a radar-enabled threat and a radar mode of that threat or for detecting a laser rangefinder or laser beamrider, and threat warning systems implementing such techniques are known in the art. As such, they will not be discussed in further detail herein.

The ring 102 additionally includes bearings 108, 110, 114, and 116. Bearings 108 and 110 are the "notch" bearings determined by a system that are the bearings to which the aircraft should turn to present a beam to a threat's radar system. In addition to displaying these bearings 108, 110, the system may determine which of the two bearings is closer to a current bearing of the aircraft and thus will require less of a turn of the aircraft to achieve. Based on that determination, the system will display in the user interface 100, in the ring 102, a turn instruction 112 that is an arrow instructing a turn to the left or to the right to head to the closest notch bearing. The system may additionally determine a bearing to which the aircraft should turn to move directly away from the threat and display this as bearing 114, and may additionally determine a bearing from the aircraft to the threat and display this as bearing 116.

The ring 102 may further include a "countermeasure ready" identifier 118 that indicates when a countermeasure system is ready to be deployed.

The ring 102 may be displayed in any suitable manner, as embodiments are not limited in this respect. In some embodiments, the ring 102 may be displayed superimposed on a map of a surrounding area, such as a topographical map 120 showing a topology or other geographic (e.g., natural) and/or structural (e.g., buildings or other man-made objects) features of the area/environment surrounding the aircraft. The ring 102 may be displayed relative to the map such that the ring 102 is centered on a current location of the aircraft in the map. In some embodiments, a user (e.g., a pilot) may be able to toggle the map 120 from being displayed in a "North up" mode or a "Heading-Up" mode that switches between showing North as the top of the map 120 or a current heading of the aircraft as the top of the map 120. In the case that "Heading-Up" mode is set, the features of the map 120 and ring 102 may rotate to different positions in the user interface 100 as the aircraft turns. As another example of a map over which the ring 102 may be displayed, the ring may be displayed superimposed on an isotropic projection, including a drawing or a photograph/video that is an isotropic projection of a surrounding environment. Such an image may be captured and displayed in real time by cameras or other sensors of the aircraft, or may be retrieved from storage for display.

In cases in which a map 120 is displayed, in response to detection of a threat, the system may additionally determine an intervisibility zone of the surrounding area and display that in the map as shaded area 122. The intervisibility zone describes an area in which the aircraft may be detectable by the threat, or the aircraft may be easiest for the threat to detect when in that zone. That zone may include, for example, areas in which there is a clear line of sight to the inferred location threat. Displaying the intervisibility zone may further aid a pilot in evading a threat. By displaying information regarding the threat in the same interface as the intervisibility zone, the pilot may be able to quickly navigate to an area outside the intervisibility zone as part of counteracting the threat. The intervisibility zone may be determined based on the geographic and/or structural features of the environment, as well as on the type of threat and the altitude of the aircraft. Techniques for determining an intervisibility zone are known and will not be discussed further herein.

In some embodiments, in addition to calculating the intervisibility zone, the countermeasure assistance system may also determine and recommend a path to the pilot that leads out of the intervisibility zone, such as by determining and outputting an instruction of a series of bearings and distances to travel to exit the intervisibility zone. In some such embodiments, the system may account for a mission purpose or mission path in determining the recommendation, such as by calculating a path that leads out of the intervisibility zone and continues along the original path set for the mission toward a mission objective. In other embodiments, the system may additionally or alternatively determine the path to recommend by determining a fastest route out of the intervisibility zone.

Figure 2A:
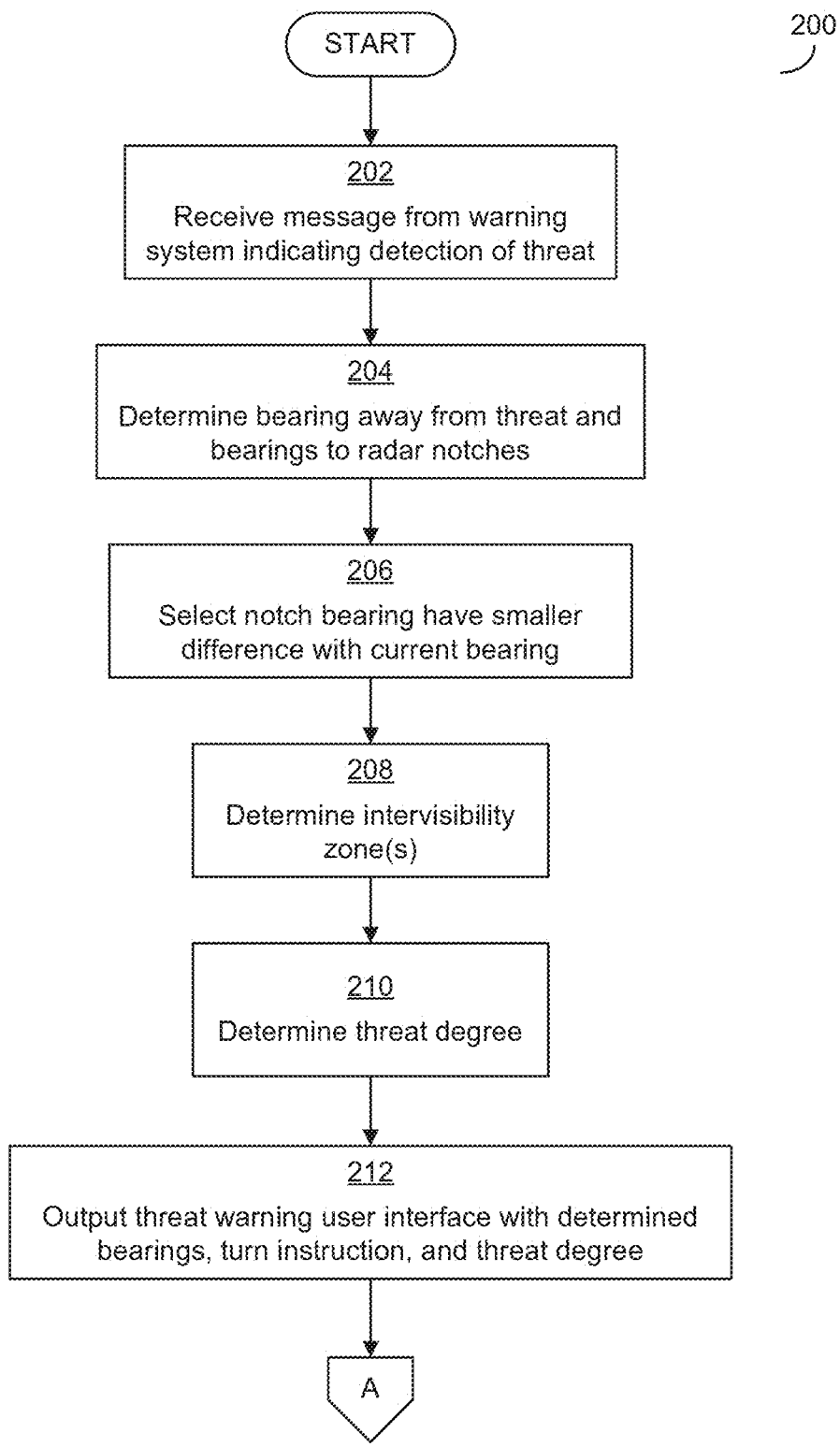
FIGS. 2A and 2B, is a flowchart of an exemplary process for operating a countermeasure assistance user interface, which may be implemented by a countermeasure facility in some embodiments.
Figure 2B:
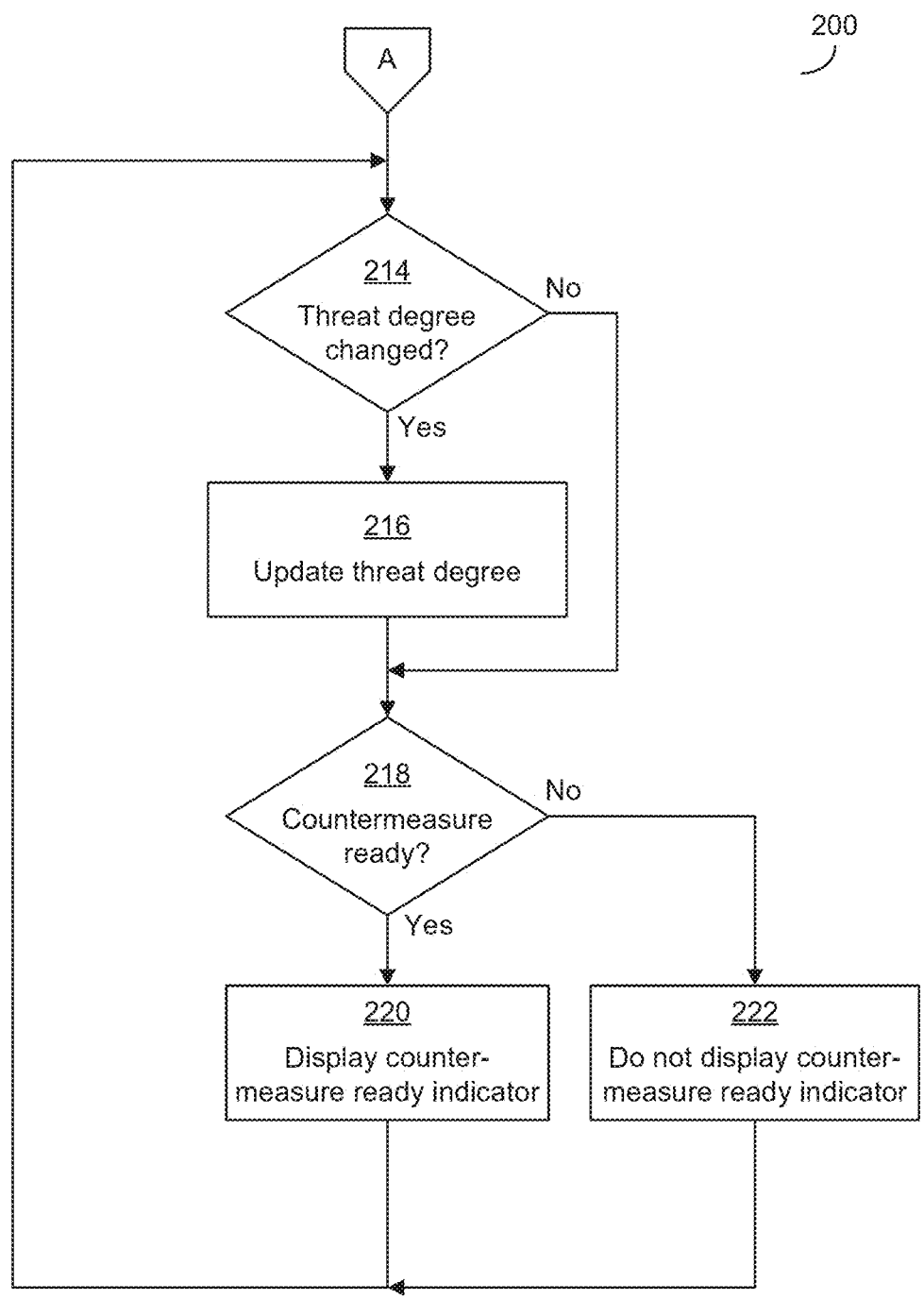

FIG. 2, which is split across FIG. 2A and FIG. 2B, illustrates an example of a process that may be implemented by a countermeasure facility of an aircraft, by executing on one or more processors of the aircraft. The processor(s) executing the countermeasure facility may be, for example, one or more mission processors of the aircraft, which may be communicatively coupled to one or more other systems of the aircraft, including one or more threat warning systems, one or more countermeasure systems, or other systems. The countermeasure facility may implement techniques described herein and display a user interface, such as one of the type illustrated in FIG. 1.

The user interface may be displayed via any suitable display of an aircraft, as embodiments are not limited in this respect. For example, in some embodiments, the countermeasure facility may output the user interface for presentation via a multifunction display (MFD) integrated with a cockpit dashboard of the aircraft or integrated with the aircraft at any other suitable location. As another example, in some embodiments, the countermeasure facility may additionally or alternatively output the user interface for presentation via a Heads-Up Display (HUD) that projects the user interface on a surface of the aircraft, such as a windshield. As a further example, in some embodiments, the countermeasure facility may additionally or alternatively output the user interface for presentation via a display integrated with a pilot's helmet, such as a HUD projected on a surface integrated with the helmet so as to be positioned in front of the pilot's face.

The process 200 begins in block 202, in which a countermeasure facility receives a message (or one or more messages) from a warning system that a threat has been detected. The message may indicate a bearing to the threat, a type of the threat, a degree of the threat, or any other suitable information about the threat. The message may come from any suitable warning system, including a missile warning system, a laser warning system, a hostile fire warning system, a radar warning system, or any other system, including known warning systems. The message may be communicated using any suitable communication protocol. In some embodiments, the message(s) may be communicated using an ARINC 429 protocol, and MIL-STD-1553 protocol, an Ethernet protocol, or any other suitable protocol.

In response to the message, the countermeasure facility in block 204 determines the bearing directly away from the threat, which may be a bearing 180 degrees opposite the bearing to the threat identified in the message received in block 202. If the facility determines that the threat is of a nature that may be counteracted with a turn of the aircraft to a particular heading, the facility may additionally determine one or more headings that may assist with counteracting the threat. For example, some threats may be counteracted by moving as quickly as possible directly away from the threat, and the recommended heading may be the bearing directly away from the inferred location of the threat. Other threats may be counteracted by presenting a particular countermeasure system of the aircraft in a direction of the threat. This may be the case, for example, when an aircraft includes an optical system to counteract a laser and, when a laser rangefinder or other laser system is detected, the aircraft should be turned to present the optical system in a direction of the laser.

In the example of FIG. 2, determining the bearings to which to turn to counteract the threat includes determining two radar "notch" bearings. These are the bearings that are 90 degrees clockwise and counter-clockwise away from the bearing to the threat. By turning to these bearings, the pilot may present a "beam" of the aircraft to a radar of the threat. As discussed above, when the threat is radar-enabled, this may assist in counteracting the threat by making the aircraft more difficult for the radar system to detect. Additionally, in block 206, the facility evaluates the two "notch" bearings relative to a current bearing of the aircraft to select which of the two bearings is closer to the current bearing. This represents the shortest turn to present a beam of the aircraft toward the threat. Determining the shortest turn and, as described below, instructing the pilot on that turn will help the pilot in quickly responding to the threat and may improve the aircraft's and pilot's chances of evading and surviving the threat. In the case that, for other types of threats, multiple other potential bearings for counteracting the threat are determined, a similar analysis and selection may be made using suitable criteria for those types of threats. Embodiments are not limited to selecting between potential bearings only for radar-enabled threats, nor are embodiments limited to selecting between bearings based only on a shortest turn.

In block 208, the facility determines an intervisibility zone for an area surrounding the aircraft. As discussed above, the facility may determine the intervisibility zone based on a topology of the environment surrounding the aircraft, the altitude of the aircraft, and the location and nature of the threat. If the aircraft changes altitude, the facility may update the intervisibility zone based on the new altitude. The facility may determine the intervisibility zone in any suitable manner, including by applying known techniques for determining an intervisibility zone or by requesting that a separate intervisibility facility or radar system provide information regarding the intervisibility zone to the countermeasure facility.

In block 210, the countermeasure facility determines a threat degree for the threat. The facility may determine the threat degree from the information received in block 202 or in any other suitable manner. For example, the facility may request that a warning system provide information on the threat. For example, the facility may request that a radar system of the aircraft identify an inferred radar mode of a threat, which the radar system may identify using known techniques for analyzing detected radar pulses.

In block 212, the countermeasure facility displays the information received and/or determined in blocks 202-210 in a user interface. The user interface displayed in block 212 may be the user interface 100 of FIG. 1, or another user interface.

Following display of the user interface, the countermeasure facility may update the user interface over time as conditions change. In block 214, the countermeasure facility may determine whether a threat degree of the threat has changed, such as by evaluating information received from a warning system regarding a threat in response to a request for updated information, or by evaluating information pushed to the countermeasure facility from the warning system. If the threat degree has changed, then in block 216 the countermeasure facility updates the threat degree in the user interface. If not, then the facility continues to block 218 in which the facility determines whether a countermeasure system (e.g., a chaff system or a radar jamming system) is ready to be deployed. The facility may determine whether the countermeasure system is ready to be deployed in any suitable manner, including by evaluating information received from the countermeasure system regarding readiness in response to a request from the countermeasure facility, or by evaluating information pushed to the countermeasure facility from the countermeasure system. If the countermeasure facility determines in block 218 that the countermeasure system is ready to be deployed, then in block 220 the facility updates the user interface to display the countermeasure ready indicator. If, however, the facility determines in block 218 that the countermeasure system is not ready to be deployed, such as because it was recently deployed and the system is still preparing to be deployed again or for any other reason, then in block 222 the facility updates the user interface such that the countermeasure ready indicator is not displayed. After the countermeasure ready indicator is or is not displayed, the facility loops back to block 214 to determine again whether the threat degree has changed.

FIGS. 3A-3L illustrate examples of user interfaces 300 that present information to a pilot of an aircraft regarding threats to the aircraft. It should be appreciated that the user interfaces of FIGS. 3A-3L are merely illustrative, as other interfaces are possible. While the discussions of FIGS. 3A-3L focus on the visual nature of the user interfaces, it should be appreciated that embodiments are not limited to presenting information via a visual interface. In the embodiments of FIGS. 3A-3L, the information on the nature, degree, and location of the threats may be additionally (or alternatively) presented via an audible interface, haptic interface, or any other suitable manner of presenting information.

Figure 3A:
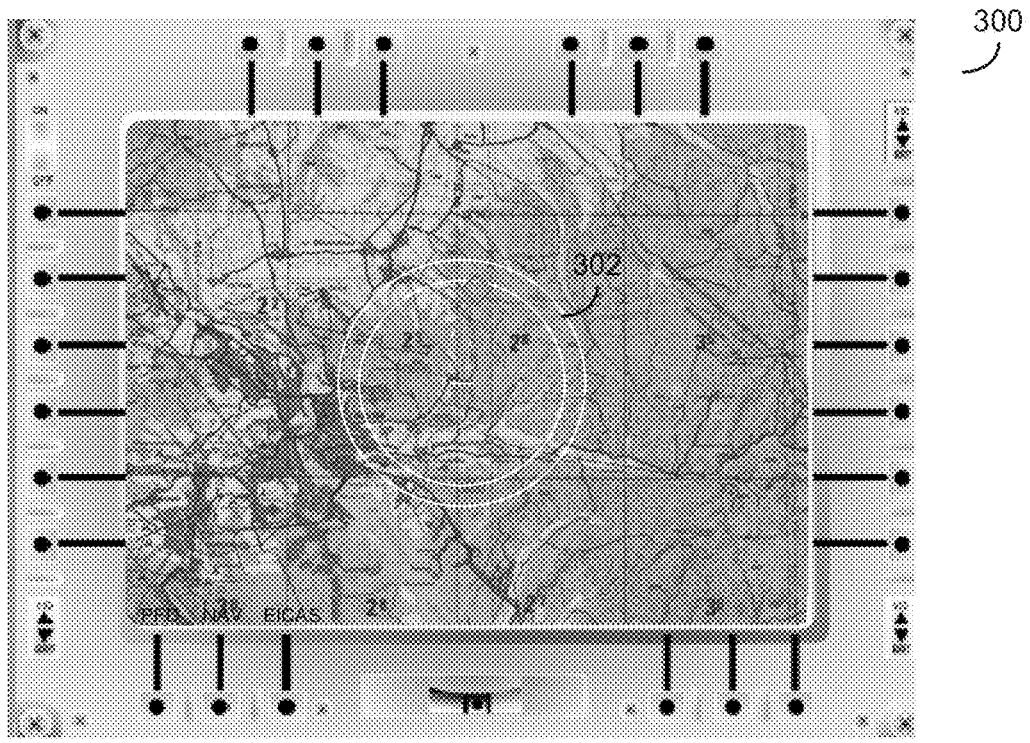
FIGS. 3A-3M are different examples of user interfaces that may be implemented in some embodiments.

The graphical user interface 300 of FIG. 3A includes a map of an environment surrounding the aircraft, centered on a position of the aircraft. The interface 300 additionally includes a mission path that the aircraft is following to a mission objective, shown as a series of connected waypoints. With respect to the countermeasure assistance system described herein, the interface 300 includes a ring 302 that is also centered on the aircraft's position. As shown in FIGS. 3B-3L, and as discussed above in connection with FIG. 1, that ring 302 may be used by the countermeasure assistance system to display information regarding threats and potential threats. As discussed above and as shown in examples discussed below, the countermeasure assistance system may format the ring 302 to provide information regarding a location of the threat (including as a bearing toward the threat), a nature of the threat, and/or a degree of the threat. While examples of a ring have been given, it should be appreciated that a ring/circle is only one example of a user interface element. Other geometric shapes other than a ring/circle may be used in other embodiments. In addition, it should be appreciated embodiments are not limited to presenting the information via the user interface using the formatting of a geometric shape.

Figure 3B:
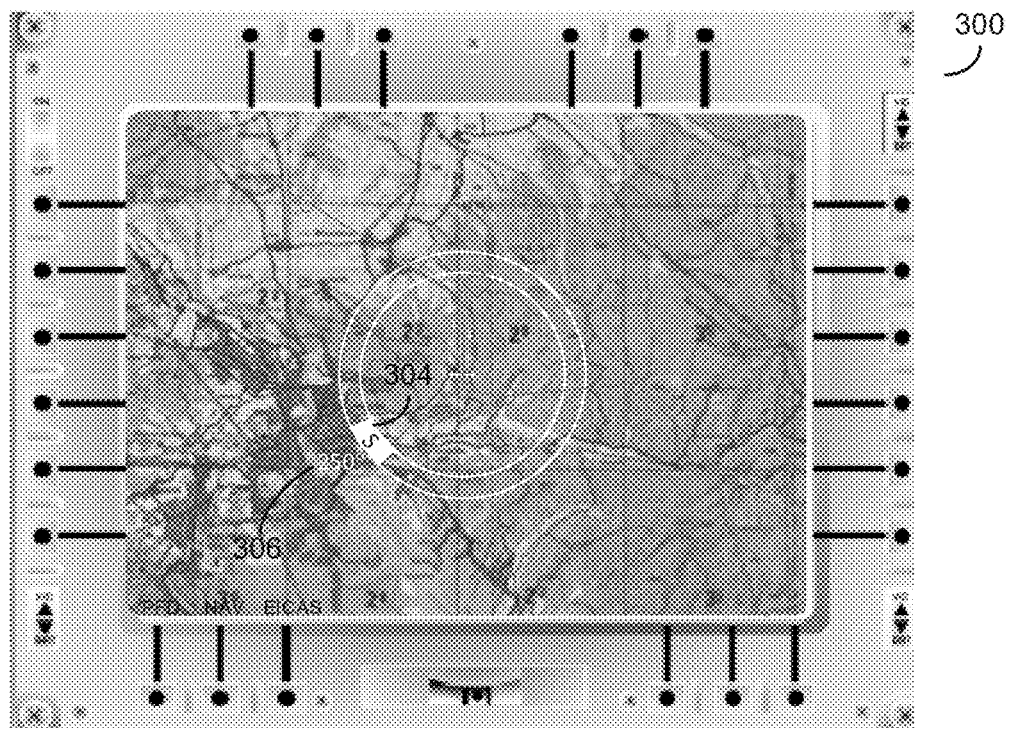

FIG. 3B illustrates one way in which the ring 302 may be formatted to present information regarding a threat. The countermeasure assistance system may receive a message from a threat warning system indicating that a radar in normal scanning (or search) mode has been detected at a bearing of 250 degrees from the current heading of the aircraft. In response, the system may format the ring 302 to present information regarding the threat. As shown in FIG. 3B, the system may format a portion 304 of a wedge of the ring 302, which is a portion of a wedge between the two concentric circles of the ring 302. The portion 304 of the wedge may be a portion positioned in the ring 302 at the bearing toward the threat, to represent a detected position of the threat. The ring 302 may also be formatted with a color (in the example of FIG. 3B, white) and an animation (in the example of FIG. 3B, a lack of any animation, as there is simply a solid coloring) to signify the degree of the threat, which in the example of FIG. 3B is a low threat. In addition, the ring 302 may be formatted to include an identifier for a nature of the threat, which in the example of FIG. 3B is the letter "S" for a radar-enabled threat that is in a normal scanning (or search) mode.

Figure 3C:
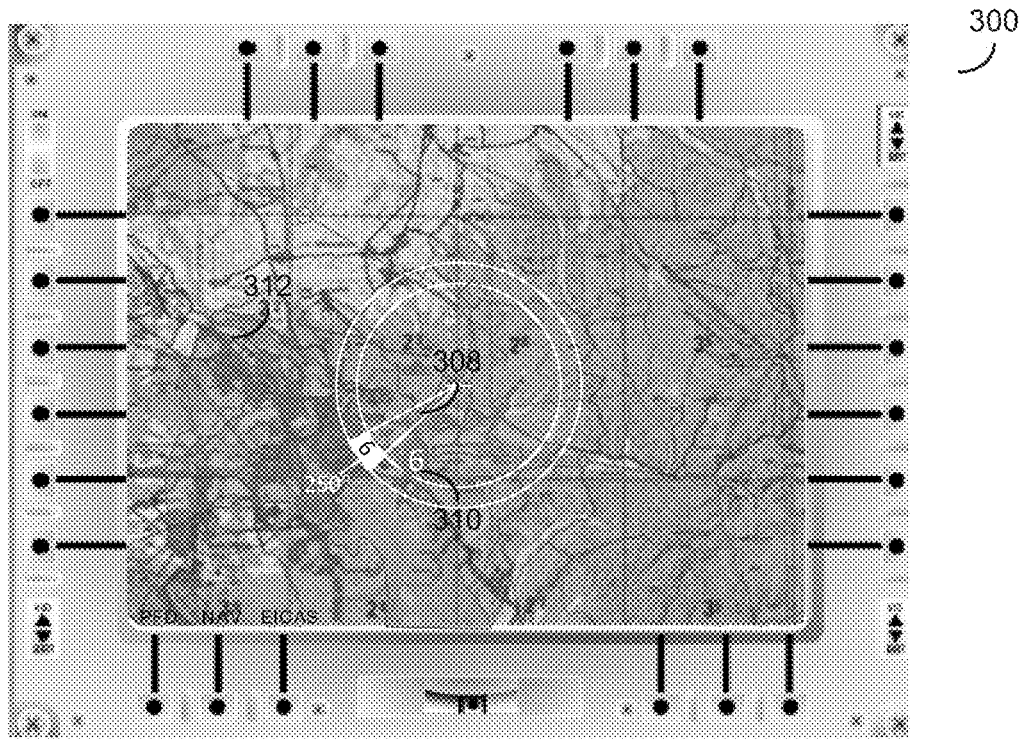

FIG. 3C illustrates a change made to the interface 300 by the system due to a change in the degree of the threat. The system may receive another message from the threat warning system indicating that the detected radar has changed to a targeted search mode, following initial detection of the aircraft and during an acquisition process. In response to this change in degree, the system updates the interface 300 to show a full wedge 308 pointing from the aircraft's position in the interface 300 toward the detected bearing toward the threat. The change in the formatting of the wedge 308 to include a full outline of a wedge indicates the increased degree of the threat, in this case due to the change from search to acquisition mode. In the example of FIG. 3C, the animation (or lack of animation) and the color (white) demonstrates through formatting that the degree of the threat is not yet high. The formatting may be further updated with an indication of a nature of the threat, such as by changing an identifier shown in the wedge from "S" to "6" to signify a type of the threat. In addition, in response to receiving a message from a threat warning system or other system of an inferred or identified position of the threat, the system may add an identifier 310 for the threat, at the location in the interface corresponding to the inferred or identified position of the threat. As shown in the example of FIG. 3C, due to differences between systems on the aircraft, there may be a discrepancy between an inferred bearing toward a threat and an inferred position of the threat. Because it may be unclear which inference is correct or more correct, both may be displayed in the interface 300. In addition, once the threat degree has increased as in FIG. 3C, the system may determine and display an intervisibility zone 312 to assist the pilot in navigating to an area where the threat may be better evaded.

Figure 3D:
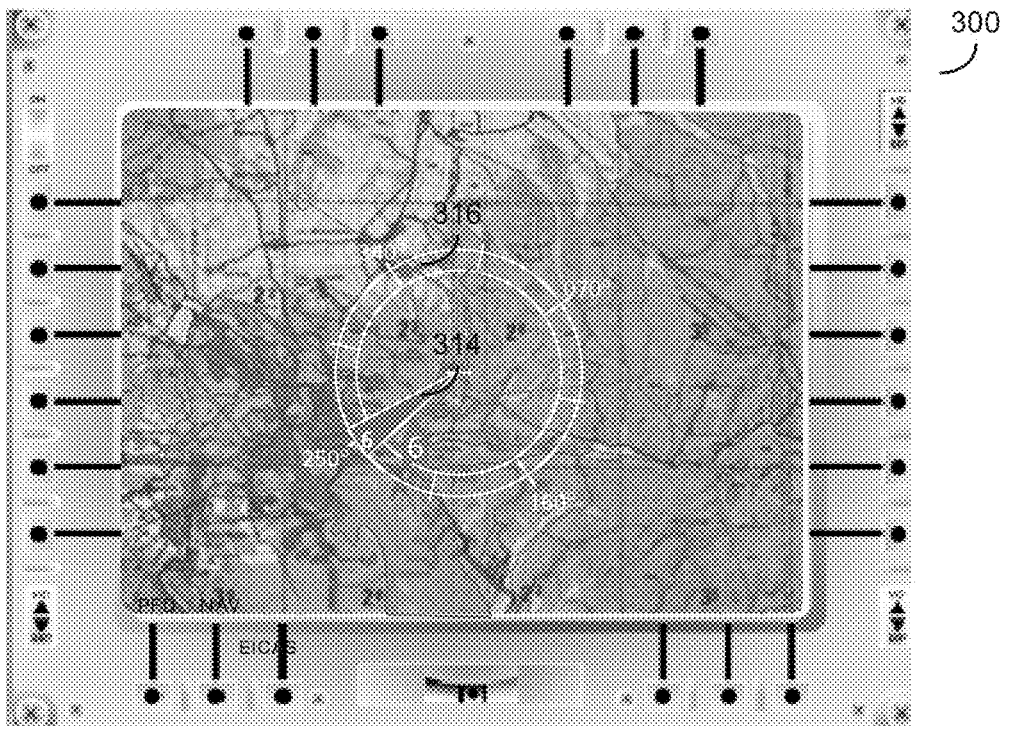

FIG. 3D illustrates a change made to the interface 300 by the system due to a further change in the degree of the threat. The system may receive another message from the threat warning system indicating that the detected radar has changed to tracking mode, following acquisition of the aircraft. In response to this change in degree, the system updates the interface 300 to show the increased degree of the threat (in this case, from acquisition to tracking mode), by changing a formatting of the wedge 314 to color the wedge red. In addition, the system may determine a recommended bearing to which to turn to present a beam of the aircraft to the radar-enabled threat, as shown in instruction 316 that tells the pilot to turn toward the left and to bearing 340 degrees.

Figure 3E:
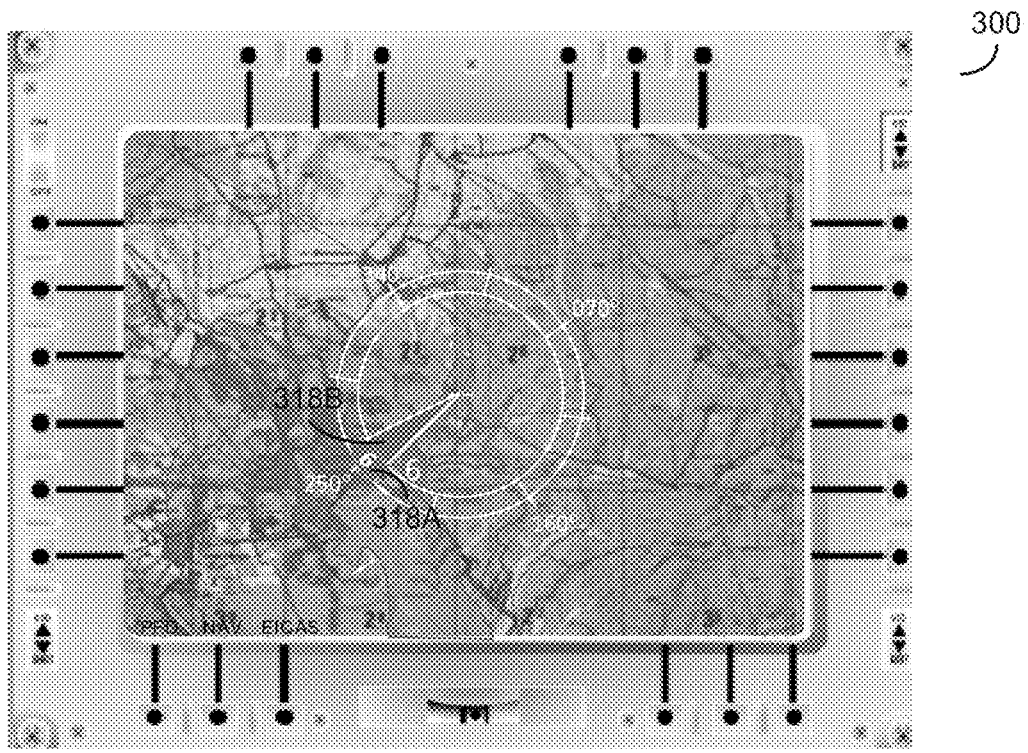
Figure 3F:
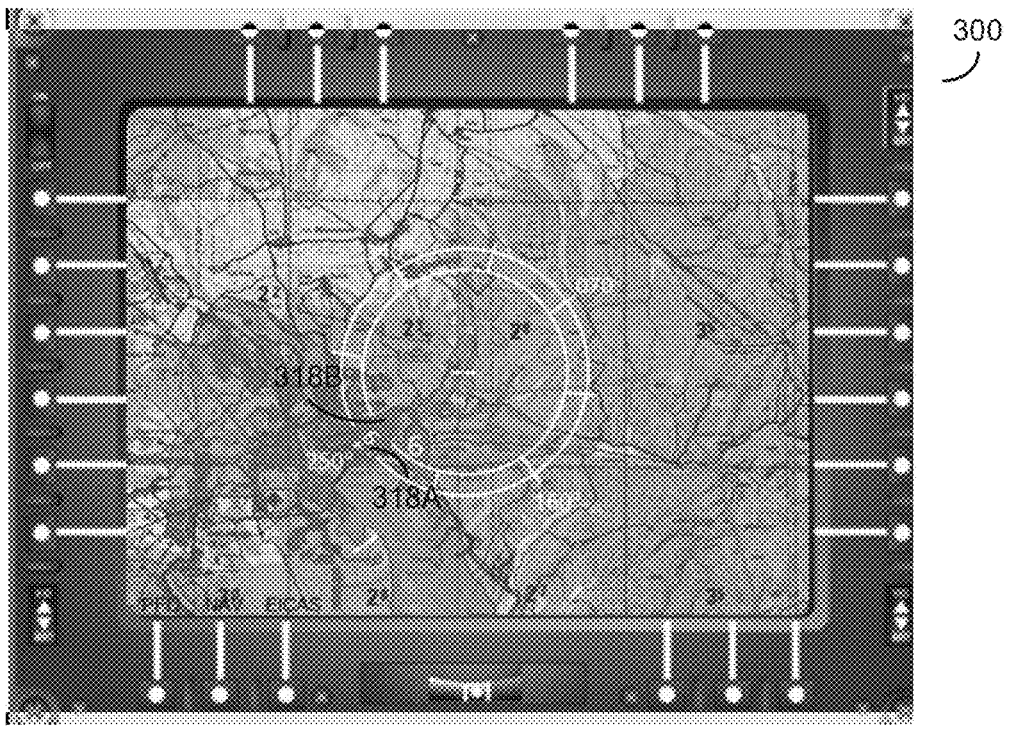

FIGS. 3E and 3F illustrate a further change made to the interface 300 by the system due to a further change in the degree of the threat. The system may receive another message from the threat warning system indicating that a projectile (such as a missile) has been launched. In response to this further change in degree, the system may further adjust formatting to indicate the high degree of threat. In particular, the wedge may be animated, at least in part. A portion 318A of the wedge may be kept a solid color in the example of FIGS. 3E and 3F, but the portion 318B may be animated to propagate from the outside of the ring toward the position of the aircraft in the interface 300. (Or, in other embodiments, propagating the other direction.) The animation may include alternately adding and removing the color from the portion of the wedge 318B, in the propagating direction toward the position of the aircraft in the interface 300.

Figure 3G:
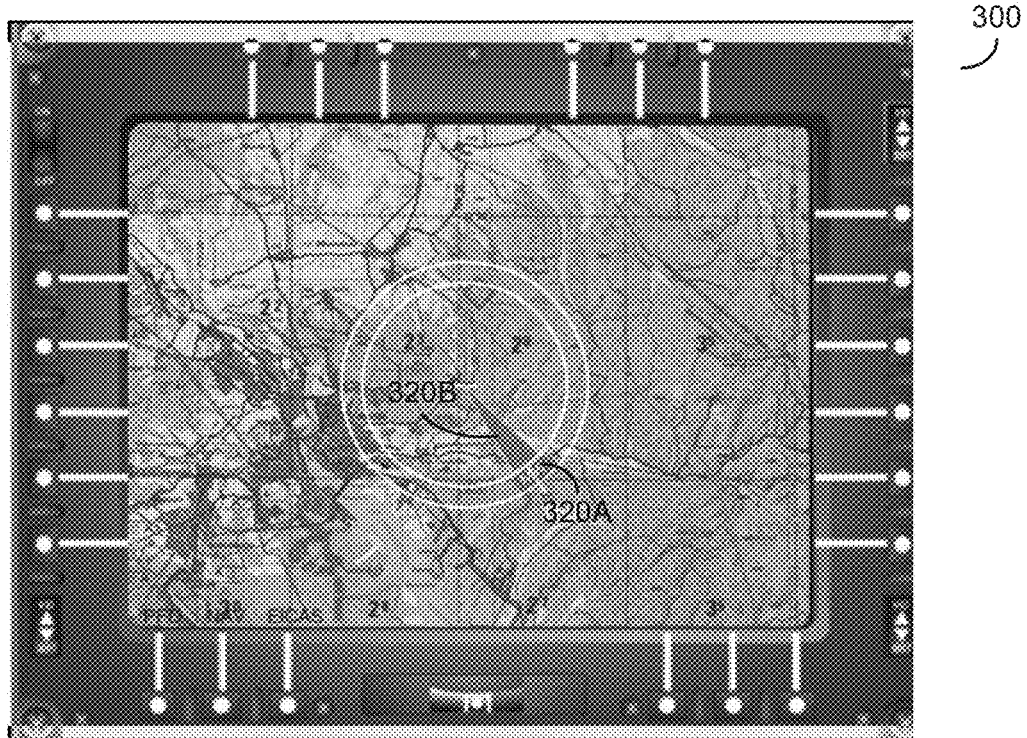
Figure 3H:
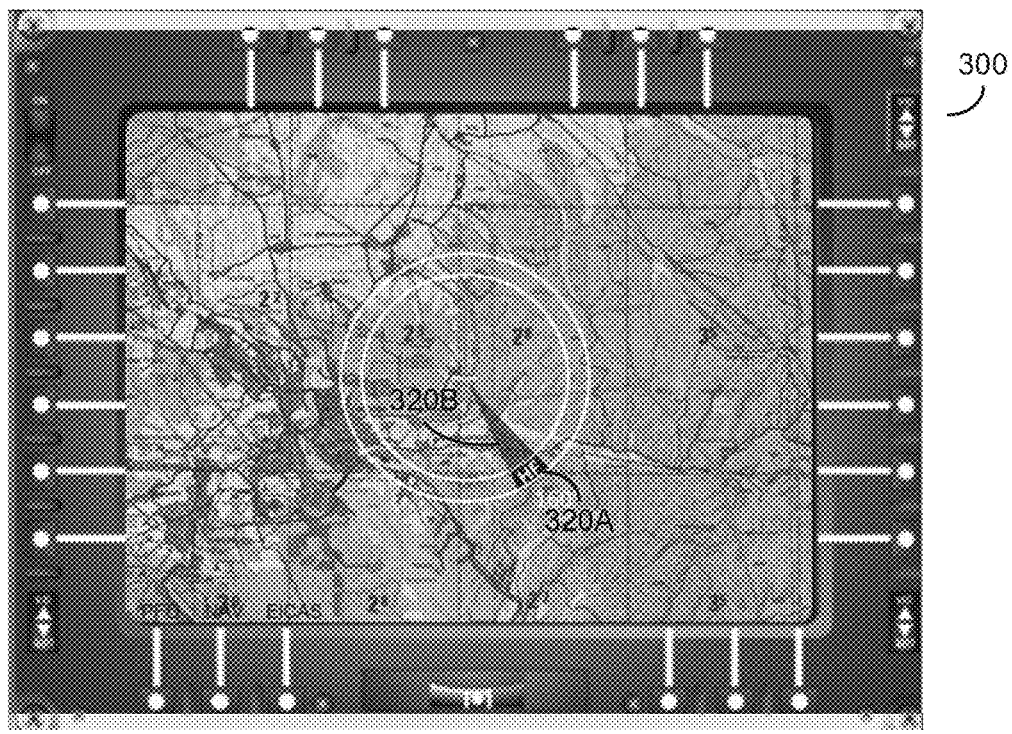

FIG. 3G illustrates another example of an animation that may be used in the case of a high degree of threat. FIG. 3G shows an interface 300 including the ring centered on the position of the aircraft in the interface. In the case that a message received from a threat warning system indicates launch of a shoulder-mounted missile (a MANPAD missile) was detected, the interface of FIG. 3G may be displayed. Similar to FIG. 3F, a wedge of the ring that is oriented toward the detected threat may be animated to represent the degree of the threat. Also similar to FIG. 3F, the wedge may be formatted in two parts. A first part 320A may be held a solid color, red in the example of FIG. 3G, and may include an identifier for a type of threat, which in the example of FIG. 3G is "MW" for "missile warning." The second part 320B may be animated. Part 320B may be animated with a different animation from that shown in FIG. 3F to enable a pilot to quickly determine a nature and degree of threats, from different formatting. In the example of FIG. 3G, the animation may include slowly increasing and decreasing a transparency of the color applied to part 320B, to make the part 320B alternate between fully transparent and full opaque over time. The example of FIG. 3G illustrates the part 320B fully opaque. FIG. 3H illustrates a similar animation for a different type of threat, and shows a partially transparent part 320B. In the example of FIG. 3F, a different color (black) and a different identifier ("HF", or "hostile fire" for a gun or firearm threat) are used to distinguish the nature of the threat from the missile threat of FIG. 3G. However, a similar animation may be used to illustrate a similar degree of the threat.

Figure 3I:
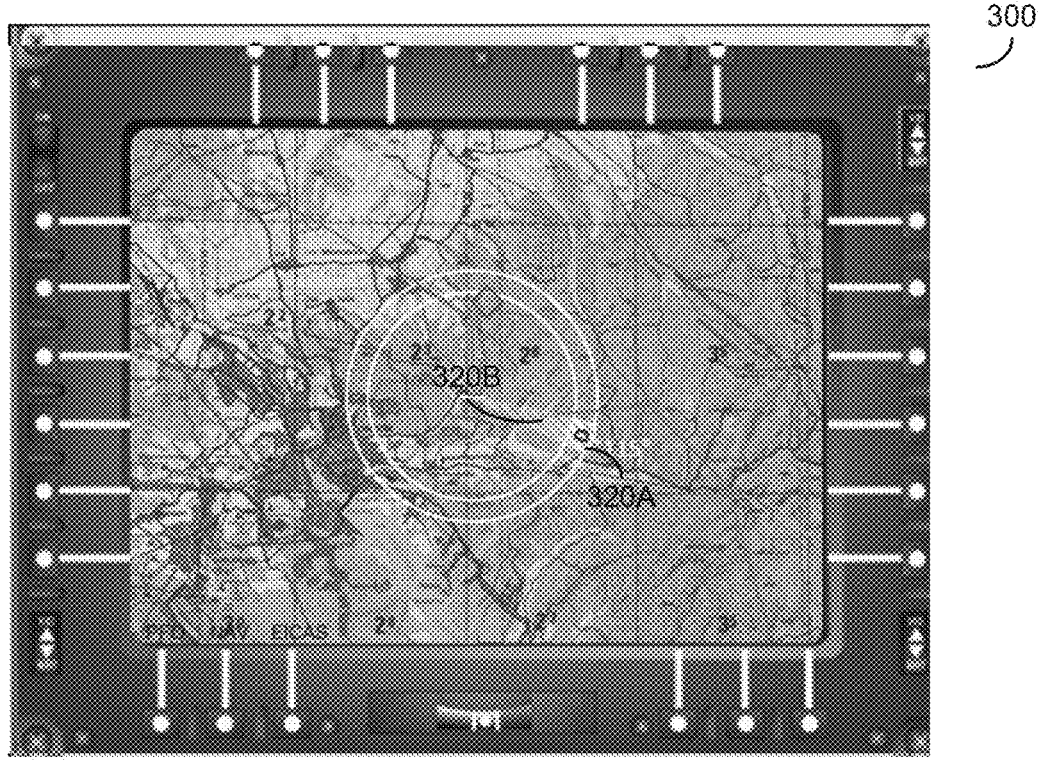
Figure 3J:
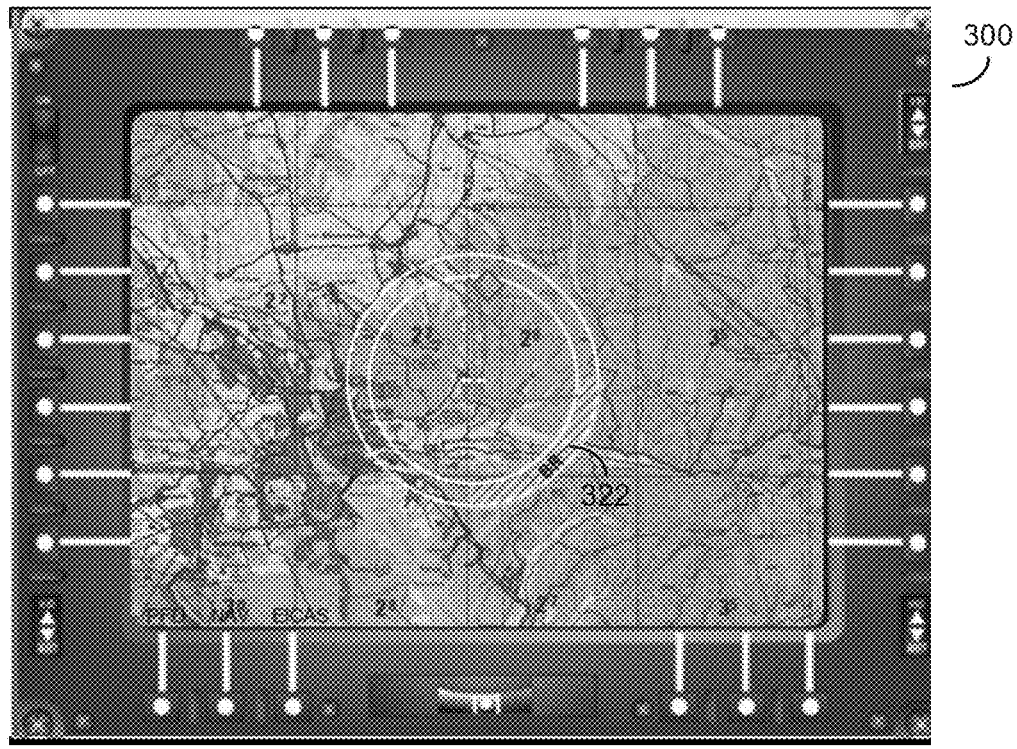

FIGS. 3I and 3J illustrate other examples of formatting that may be used to identify other types of threats. In this case, both relate to laser threats such as laser designators, laser rangefinders, and laser beamriders. In the example of FIG. 3I, when a message from a threat warning system indicates that a laser designator or laser rangefinder has been detected, the countermeasure assistance system may output a wedge with two parts 320A and 320B, that is animated similarly to that discussed above with respect to FIGS. 3G and 3H. Part 320A may include an identifier for a type of the threat, such as a "D" for a laser designator or an "R" for a laser rangefinder. In addition, as was discussed with respect to the differences between FIGS. 3G and 3H, a different color may be used to distinguish the different type of the threat, despite the similarity of animation. In the example of FIG. 3I, the laser threats may be represented by a green-and-white striping rather than a single color.

FIG. 3J illustrates that this same color—green-and-white striping—may be used with laser beamriders, when a message from a threat warning system indicates that a laser beamrider has been detected. The system may format a portion of a wedge 322 oriented in the direction of the directed beamrider, to indicate the threat. Because the precision of detection of a beamrider may be lower, the portion of the wedge may be much larger. To avoid obscuring a large portion of the interface 300, only the outer portion of the wedge 322 may be displayed, rather than having a two-part wedge as in other examples. In the example of FIG. 3J, the wedge 322 may be animated, such as by adjusting transparency over time as discussed above.

Figure 3K:
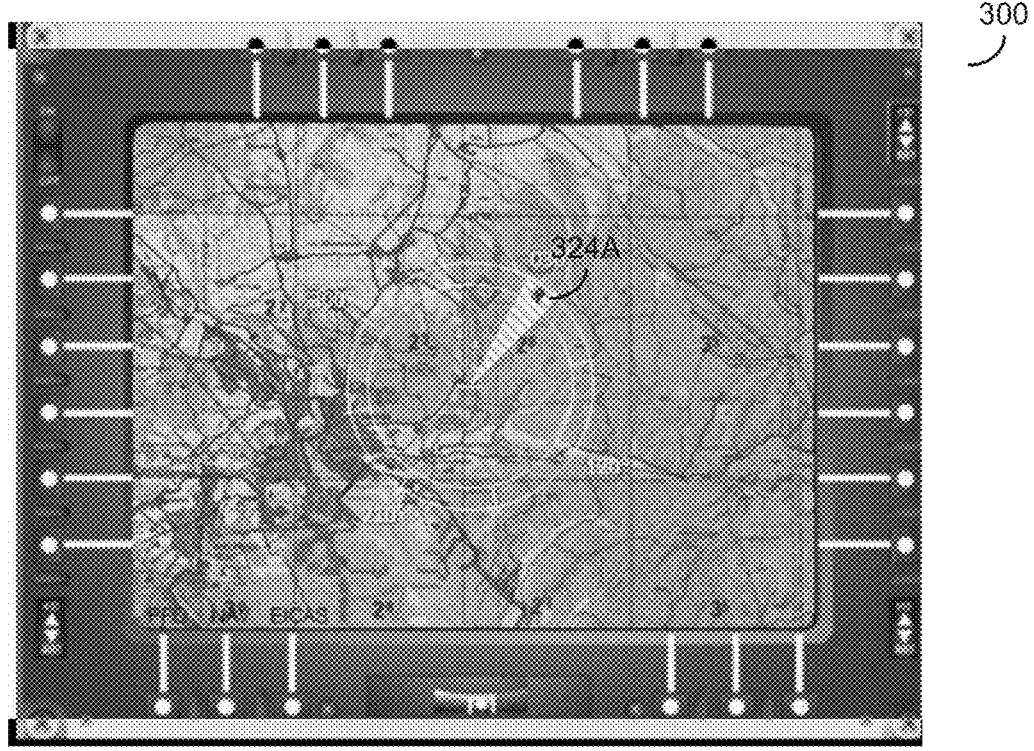
Figure 3L:
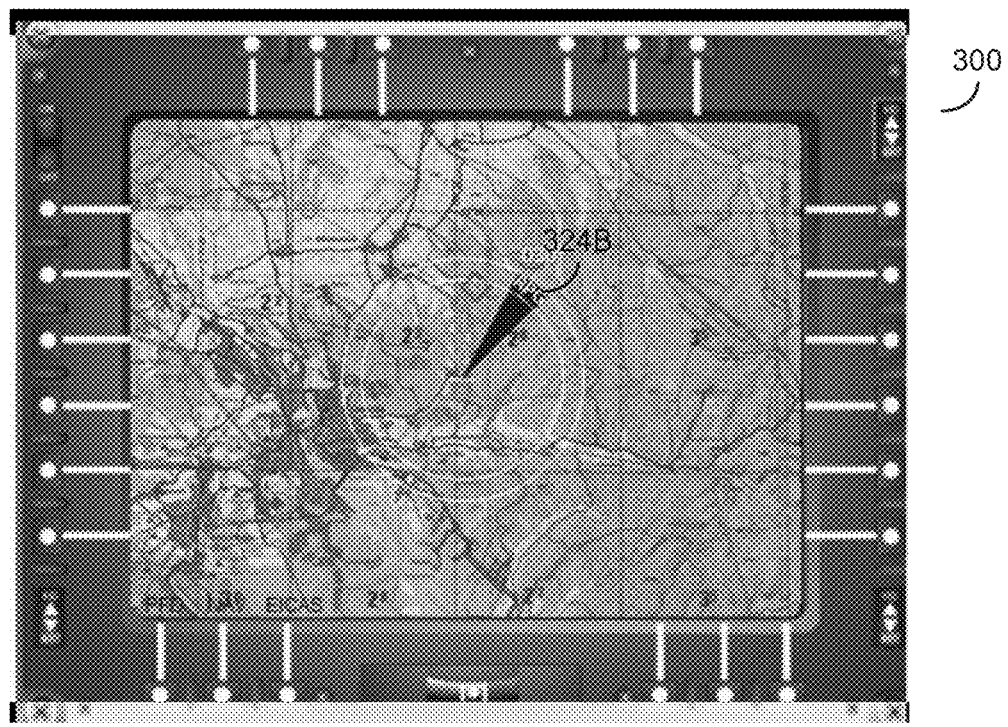

FIGS. 3K and 3L provide an example of how an interface 300 may be used to present multiple concurrent threats. Additional details regarding multiple concurrent threats are provided in connection with FIG. 4 below. In the example of FIGS. 3K and 3L, a laser rangefinder ("R" identifier in FIG. 3K) and a rocket-propelled grenade ("RPG" identifier in FIG. 3L) are detected from a same location. If the threats are from different locations, the two wedges may be displayed concurrently. However, because the two threats were detected at the same location, the system may alternate (called "mippling") between displaying information on the two threats. Accordingly, over time, the system may alternate between FIGS. 3K and 3L, to provide information on both threats to the pilot.

Figure 3M:
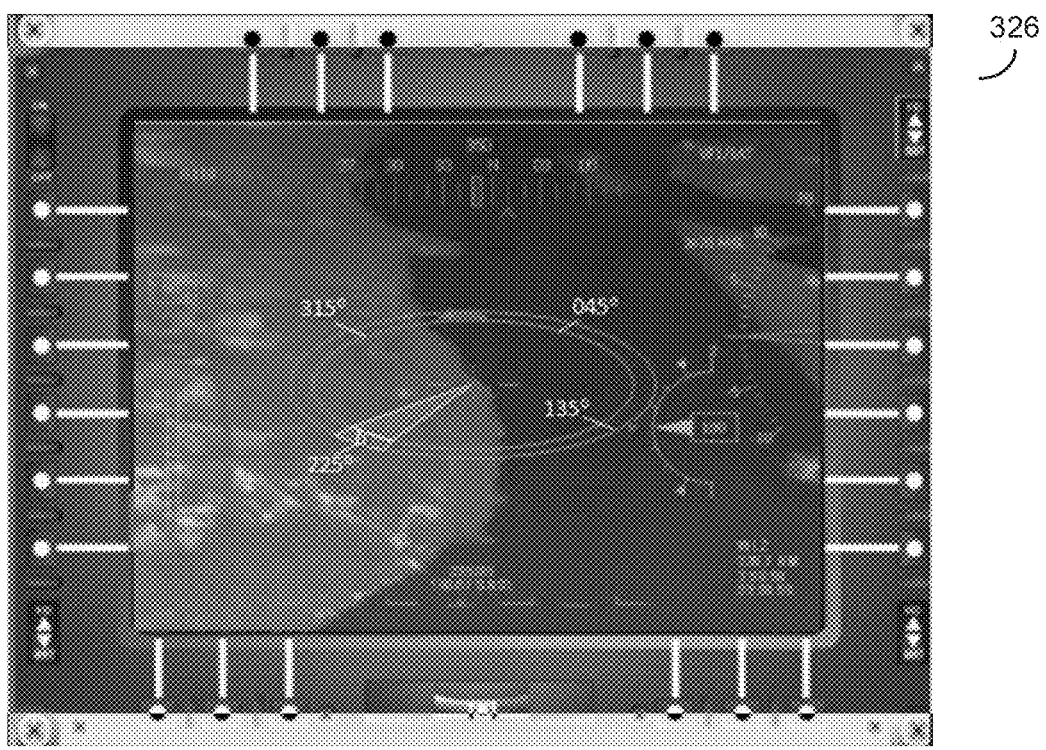

FIG. 3M illustrates an example of another interface 326, in which an isotropic image is displayed in place of a map. In this example, the same type of interface as discussed above may still be used, including the ring and wedge. However, the ring and wedge may be oriented so as to correspond to the isotropic view on which the ring and wedge are superimposed.

While various examples of interfaces have been given in connection with FIGS. 3A-3M, it should be appreciated that these are merely illustrative and that other interfaces may be used.

As discussed above in connection with FIGS. 3K and 3L, there may be times when multiple concurrent threats to an aircraft are detected. These threats may originate from one location, or may originate from multiple locations. In some embodiments, the countermeasure assistance system may present information on all detected threats to a pilot, to ensure the pilot is fully aware of all threats and can respond accordingly. In other embodiments, the countermeasure assistance system may filter information on detected threats, and only present information on some threats to a pilot. In some such embodiments, the system may be configured with an upper limit on a number of concurrent threats for which to output information at one time, such as no more than one threat, no more than two threats, no more than three threats, no more than five threats, or any other suitable value. In such a case, if there are more threats are detected at a time than the system will concurrently output information regarding, then the system may select from among the threats to determine information to output.

Figure 4:
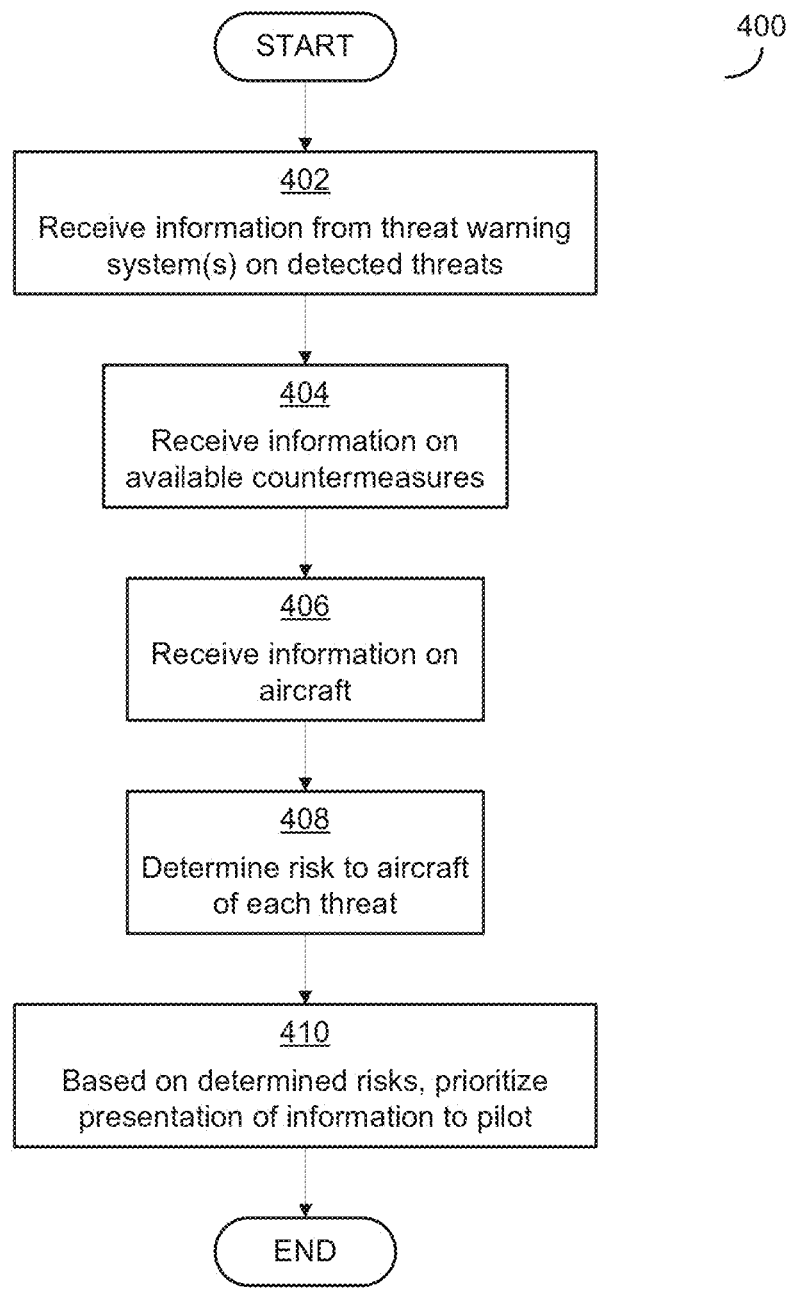
FIG. 4 is an example of a process that a countermeasure facility may implement in some embodiments for evaluating and prioritizing different threats.

FIG. 4 illustrates an example of a process 400 that a countermeasure facility may execute to select, from among multiple concurrent threats, one or more threats for which information will be presented via a user interface. In the example of FIG. 4, the facility prioritizes the threats to report based on a risk posed by each of the threats to the aircraft. In this way, the threat(s) for which there is the highest risk of the aircraft being hit by and critically damaged by (including destroyed by) the threat(s) are reported via the interface, while information regarding other threats may be suppressed, at least temporarily. This may allow the pilot to focus on the threats that pose the greatest danger to the aircraft and/or to the pilot's or other passengers' lives, and focus on evading and surviving those threats before considering the less-risky threats. It should be appreciated, however, that embodiments in which a countermeasure facility selectively presents information on threats are not limited to making a selection based on risk, as other criteria may be used.

More specifically, the countermeasure facility may be configured to make a selection consistent with an equation representing a probability of the aircraft being "killed" when hit by each threat of the multiple concurrent threats (or a complementary probability of "survivability" of the threat). This probability of kill $P_K$ may be represented by the equation:

$$P_K = P_A \cdot P_{DIT} \cdot P_{LGD} \cdot P_{K|H}$$

with the complementary probability of survivability represented as $P_S = 1 - P_K$. These equations for $P_K$ and $P_S$ are known, at least from *Fundamentals of Combat Aircraft Survivability* by Dr. Robert Ball. In the $P_K$ equation, the variables are:

$P_A$: The probability that a given threat is "active" at a time. This may vary over time, such as the case that a threat is only active during daytime hours or nighttime hours. It may also be a value less than 1, such as in a case that a threat is manually operated and an operator may take breaks or not be vigilant while operating the threat. This value may be calculated in advance for a particular type of threat, or for a mission for a particular threat that is known to be in an area. Accordingly, in some embodiments, this value may be retrieved from storage for a threat once the threat is detected.

$P_{DIT}$: The probability that a given threat is able to Detect the aircraft, as well as Identify the aircraft, and Track the aircraft. This value may vary between threats and, for threats, between aircrafts. For example, some types of threats may have difficult detecting or tracking an aircraft of a particular time. As such, this value may be calculated based on information about the threat and about the aircraft, and may be calculated in advance and retrieved from storage upon detection of the threat. Though, this value may also be impacted by available countermeasures of an aircraft, such as active countermeasures like optical systems to counteract lasers or chaff or flare systems to counteract radar-enabled threats, or other countermeasures like turning to the notch as discussed above. Such countermeasures may affect the threat's ability to Identify and Track. Whether such countermeasures are available, or how many such countermeasures are available (e.g., a number of flare canisters), at a time may therefore in some embodiments be accounted for in the $P_{DIT}$. In such a case, the facility may receive information on a number and type of available countermeasures and the past history of success of such countermeasures for this aircraft and/or for threats of this type, and use that information in calculating the $P_{DIT}$.

$P_{LGD}$: The probability that a threat is able to Launch a weapon, Guide the weapon to the aircraft, and Detonate the weapon. As with $P_{DIT}$, this value may be stored in advance, given information about how susceptible the aircraft is to a type of threat. However, also as with $P_{DIT}$, this value may be calculated dynamically, based on a number and type of available countermeasures as discussed above.

$P_{K|H}$: The probability that the aircraft will be Killed (i.e., critically damaged, including destroyed) if Hit by the threat. This value may be stored in advance based on information about how susceptible the aircraft is to the weapons with which a type of threat may be equipped. When a threat of a particular type is detected, the $P_{K|H}$ value for that threat may be retrieved from storage.

These values may be generally grouped into susceptibility of the aircraft to the threat ($P_A$, $P_{DIT}$, $P_{LGD}$) and vulnerability of the aircraft to the threat ($P_{K|H}$).

In connection with this analysis, the process 400 begins with receiving a variety of information. In block 402, the countermeasure facility receives information from one or more threat warning systems on one or more detected threats. The information on the threat(s) may include a nature and/or degree of each threat. The facility additionally receives, in block 404, information on available countermeasures from one or more countermeasure systems, which may include information on a type of countermeasures available and a number of each countermeasure. In block 406, the facility receives information on the aircraft, which may include information on a type of the aircraft or properties of the aircraft, such as a reflectivity of the aircraft to radar or lasers, a thermal signature of the aircraft, or other properties of the aircraft that may impact detectability or trackability of the aircraft.

In block 408, the facility uses the received information to determine a risk to the aircraft posed by each detected threat. Specifically, the facility may determine a susceptibility of the aircraft to the threat and a vulnerability of the aircraft to the threat, using some or all of the retrieved information. As discussed above, this may include evaluating the information in the context of the above equation and above variables, with information on available countermeasures or information on results of past encounters of the aircraft with threats of the type reducing or increasing the probabilities.

Based on those risks, in block 410 the facility prioritizes the threats and prioritizes presentation of information to the pilot of the aircraft. This may include selecting up to a certain number of the threats for which to present information in the user interface using techniques described above.

Once the presentation of information via the user interface has been prioritized in block 410, the process 400 ends. Following the process 400, information on the prioritized threats may be presented via the user interface to assist a pilot in evading those threats. Over time, the process 400 may be repeated, such as once countermeasures have been used and are no longer available, as a threat becomes neutralized through a countermeasure, or as additional threats are detected or the degree of a threat increases. Accordingly, in some embodiments, the process 400 may be repeated over time, with the potential for different threats to be prioritized and presented to a pilot over time.

Techniques operating according to the principles described herein may be implemented in any suitable manner. Included in the discussion above are a series of flow charts showing the steps and acts of various processes that display information regarding a threat and information to assist a pilot in performing a countermeasure procedure to evade the threat. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 5:
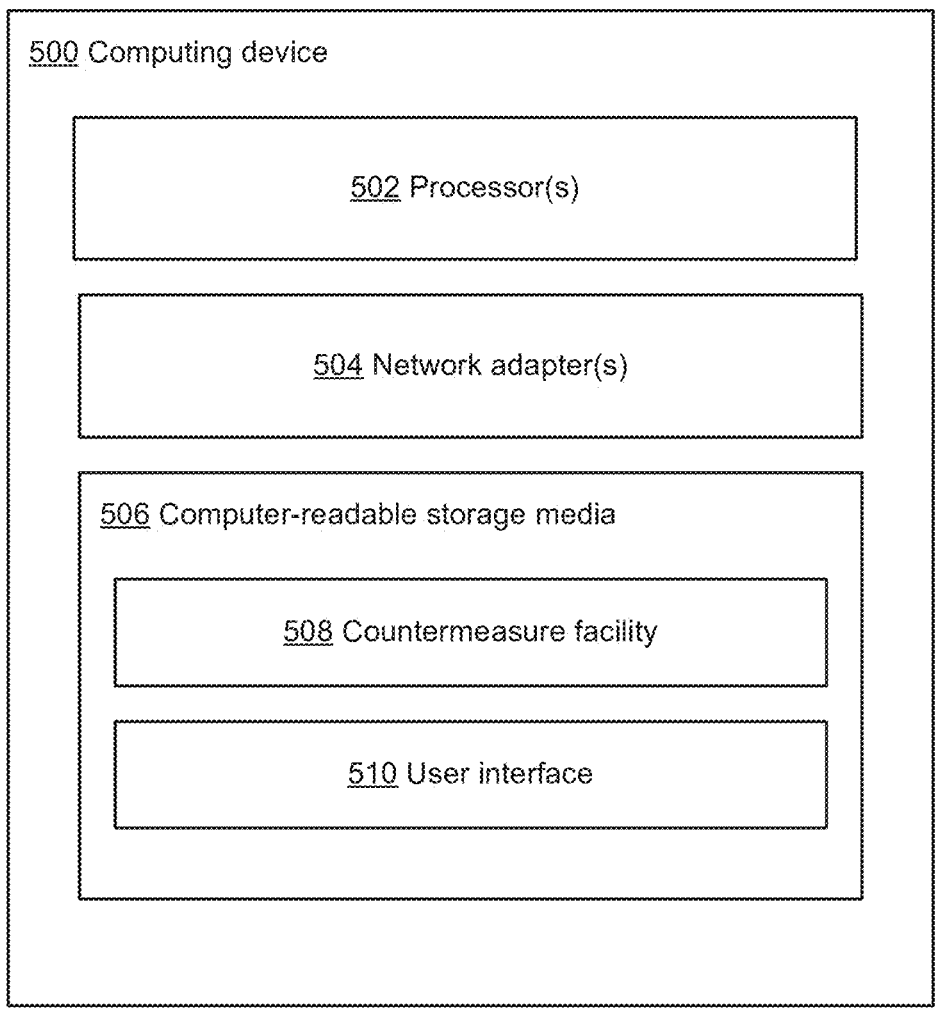
FIG. 5 is a block diagram of a computing device with which some embodiments may operate.

FIG. 5 illustrates one exemplary implementation of a computing device in the form of a computing device 500 that may be used in a system implementing techniques described herein, although others are possible. It should be appreciated that FIG. 5 is intended neither to be a depiction of necessary components for a computing device to operate as a computing device of an aircraft implementing a countermeasure procedure in accordance with the principles described herein, nor a comprehensive depiction.

Computing device 500 may comprise at least one processor 502, a network adapter 504, and computer-readable storage media 506. Computing device 400 may be, for example, a personal computer connected to an aircraft (e.g., a laptop computer mounted in a cockpit and having a wired and/or wireless connection to other systems of the aircraft)

and/or an integrated computing device of the aircraft that is specific to a countermeasure facility and/or that implements one or more other functionalities of the aircraft. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 506 may be adapted to store data to be processed and/or instructions to be executed by processor 502. Processor 502 enables processing of data and execution of instructions. The data and instructions may be stored on the computer-readable storage media 506 and may, for example, enable communication between components of the computing device 500.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store instructions of a countermeasure facility 508 and instructions of and/or graphical or textual elements of a user interface 510.

While not illustrated in FIG. 5, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An aircraft comprising:
a visual output to display information to an operator of the aircraft; and
at least one control circuit configured to:
in response to detecting a threat to the aircraft at a first bearing, determining whether the threat is a radar-enabled threat;
in response to determining that the threat is a radar-enabled threat,
calculate a second bearing to which the aircraft should be turned to counteract the threat, wherein the at least one control circuit is configured to calculate the second bearing at least in part by:
calculating a first notch bearing, wherein the aircraft would, when turned to the first notch bearing, present a left-side beam of the aircraft toward the first bearing,
calculating a second notch bearing, wherein the aircraft would, when turned to the second notch bearing, present a right-side beam of the aircraft toward the first bearing, and
selecting the second bearing from between the first notch bearing and the second notch bearing based on which of the first and second notch bearings would be reached with a shortest turn of the aircraft from a current bearing of the aircraft;
determine a direction in which the aircraft should be turned to follow the shortest turn of the aircraft toward the second bearing; and
output via the visual output an instruction to the operator of the aircraft to turn in the direction, the instruction output via the visual output graphically indicating the direction and including the second bearing.

2. The aircraft of claim 1, wherein:
the at least one control circuit comprises a mission processor of the aircraft, the mission processor being communicatively coupled to at least one threat warning system of the aircraft to receive one or more messages from the at least one threat warning system regarding a detected threat; and
the mission processor is configured to calculate the second bearing in response to a message from the at least one threat warning system regarding the threat, the message comprising the first bearing.

3. The aircraft of claim 2, wherein the mission processor is configured to output, for presentation via the visual output, the instruction to turn in the direction via a graphical user interface that displays information regarding a topology of the environment surrounding the aircraft.

4. The aircraft of claim 3, wherein:
the mission processor is further configured to receive an inferred location of the threat in the environment;
the information regarding the topology of the environment comprises a map of the environment; and
the mission processor is configured to further output, for presentation in the graphical user interface via the visual output, the position of the aircraft in the environment, the inferred location of the threat in the environment, and a geometric shape surrounding the position of the aircraft, and to further output via a formatting of the geometric shape the first bearing at which the threat was detected and the second bearing to which the aircraft should be turned.

5. The aircraft of claim 4, wherein the at least one control circuit is further configured to:
calculate an intervisibility zone for the aircraft with respect to the threat, wherein the mission processor is configured to calculate the intervisibility zone based at least in part on the inferred location of the threat in the environment, the topology of the environment, and a current altitude of the aircraft; and
output the intervisibility zone via the graphical user interface through formatting of at least a portion of the map to illustrate the intervisibility zone.

6. The aircraft of claim 5, wherein:
the mission processor is further configured to receive, in the one or more messages from the at least one threat warning system regarding the threat, an indication of a nature and/or a degree of the threat; and
the mission processor is configured to output the nature and/or the degree of the threat via the formatting of the geometric shape.

7. The aircraft of claim 6, wherein the mission processor is further configured to, in response to one or more second messages indicating a change in a degree of the threat, change the formatting of the geometric shape to indicate the change in the degree of the threat.

8. The aircraft of claim 7, wherein:
the geometric shape is a circle;
the mission processor is configured to format a wedge of the circle to indicate the nature and/or the degree of the threat; and
the mission processor is configured to adjust formatting of the wedge to indicate the change in the degree of the threat.

9. The aircraft of claim 8, wherein:
the mission processor is further configured to receive, in the one or more messages from the at least one threat warning system regarding the threat, an indication of an accuracy in detection of the first bearing to the threat;
the mission processor is configured with a plurality of formatting animations, each formatting animation of the plurality of formatting animations being associated with a threat degree of a plurality of threat degrees, each formatting animation adjusting a color, transparency, and/or size of a formatting of a wedge of the circle;

the missions processor is configured to adjust a width of the wedge to indicate an accuracy of detection of the first bearing; and
the mission processor is configured to adjust formatting of the wedge to indicate the change in the degree of the threat by selecting and outputting a formatting animation, of the plurality of formatting animations, corresponding to a current degree of the threat.

10. The aircraft of claim 1, wherein the at least one control circuit is configured to, in response to detecting multiple concurrent threats to the aircraft:
prioritize threats to the aircraft based on a risk presented to the aircraft by each of the multiple concurrent threats;
select one or more of the prioritized threats about which to present information to the pilot via the visual output at a time, and select one or more other threats about which not to present information to the pilot via the visual output at the time; and
output information about the one or more selected prioritized threats via the visual output.

11. The aircraft of claim 10, wherein:
the one or more selected prioritized threats is at least two threats;
the at least one control circuit is configured to output the information about the at least two threats by alternating over time between presenting information about each of the at least two threats via the visual output.

12. The aircraft of claim 11, wherein the at least one control circuit is configured to prioritize threats to the aircraft by calculating a probability of survivability by the aircraft for each of the multiple concurrent threats at a time the multiple concurrent threats are detected.

13. The aircraft of claim 12, wherein the at least one control circuit is configured to calculate the probability of survivability for each of the multiple concurrent threats at least in part by, for each threat:
determining, based on a nature and a current degree of the threat, a known vulnerability of the aircraft to being critically damaged if hit by the threat; and
determining, based at least in part on countermeasures for the threat currently available to the aircraft, a susceptibility of the aircraft to being engaged and/or hit by the threat.

14. A method for assisting a pilot in evading one or more threats to an aircraft, the method comprising:
in response to receiving one or more messages from a threat warning system regarding a radar-enabled threat to the aircraft detected at a first bearing, calculating a second bearing to which the aircraft should be turned to counteract the threat, wherein calculating the second bearing comprises:
calculating a first notch bearing, wherein the aircraft would, when turned to the first notch bearing, present a left-side beam of the aircraft toward the first bearing,
calculating a second notch bearing, wherein the aircraft would, when turned to the second notch bearing, present a right-side beam of the aircraft toward the first bearing, and
selecting the second bearing from between the first notch bearing and the second notch bearing based on which of the first and second notch bearings would be reached with a shortest turn of the aircraft from a current bearing of the aircraft;

determining a direction in which the aircraft should be turned to follow the shortest turn of the aircraft toward the second bearing; and outputting, via a visual output of the aircraft, an instruction to the operator of the aircraft to turn in the direction, the instruction output via the visual output graphically indicating the direction and including the second bearing.

15. The method of claim 14, wherein:

outputting the instruction to turn in the direction comprises outputting the instruction, via the visual output, in a graphical user interface that also displays information regarding a map of the environment surrounding the aircraft, the position of the aircraft in the environment, an inferred location of the threat in the environment, and a circle surrounding the position of the aircraft; and outputting the circle surrounding the position comprises formatting the circle so as to indicate the first bearing via a wedge of the circle and to indicate a nature of the threat detected at the first bearing and a degree of the threat detected at the first bearing through formatting of the wedge.

16. The method of claim 15, further comprising:

in response to receiving one or more second messages indicating a change in a degree of the threat, changing the formatting of the wedge of the circle to indicate the change in the degree of the threat.

17. The method of claim 14, further comprising, in response to detecting multiple concurrent threats to the aircraft, the multiple concurrent threats comprising the threat:

prioritizing threats to the aircraft based on a risk presented to the aircraft by each of the multiple concurrent threats;

selecting one or more of the prioritized threats about which to present information to the pilot via the visual output at a time, and select one or more other threats about which not to present information to the pilot via the visual output at the time; and output information about the one or more selected prioritized threats via the visual output.

18. At least one computer-readable storage medium having encoded thereon executable instructions that, when executed by at least one mission processor of an aircraft, cause the at least one mission processor to carry out a method for assisting a pilot in evading one or more threats to the aircraft, the method comprising:

in response to receiving one or more messages from a threat warning system regarding a radar-enabled threat to the aircraft detected at a first bearing, calculating a second bearing to which the aircraft should be turned to counteract the threat, wherein calculating the second bearing comprises:

calculating a first notch bearing, wherein the aircraft would, when turned to the first notch bearing, present a left-side beam of the aircraft toward the first bearing, calculating a second notch bearing, wherein the aircraft would, when turned to the second notch bearing, present a right-side beam of the aircraft toward the first bearing, and selecting the second bearing from between the first notch bearing and the second notch bearing based on which of the first and second notch bearings would be reached with a shortest turn of the aircraft from a current bearing of the aircraft;

determining a direction in which the aircraft should be turned to follow the shortest turn of the aircraft toward the second bearing; and outputting, via a visual output of the aircraft, an instruction to the operator of the aircraft to turn in the direction, the instruction output via the visual output graphically indicating the direction and including the second bearing.

* * * * *